US012755431B2

(12) United States Patent
Zheng et al.

(10) Patent No.: US 12,755,431 B2
(45) Date of Patent: Oct. 6, 2026

(54) VIRTUAL BINOCULAR DETECTION DEVICE AND CHIP PIN WARPAGE DETECTION METHOD

(71) Applicant: Hefei ImagEx Electronics Technology Co., Ltd., Hefei City (CN)

(72) Inventors: Fei Zheng, Hefei City (CN); Guicheng Lin, Hefei City (CN); Jingzhu Hong, Hefei City (CN); Haishuang He, Hefei City (CN); Shuangquan Rong, Hefei City (CN)

(73) Assignee: Hefei ImagEx Electronics Technology Co., Ltd., Hefei City (CN)

( * ) Notice: Subject to any disclaimer, the term of this patent is extended or adjusted under 35 U.S.C. 154(b) by 491 days.

(21) Appl. No.: 18/455,364

(22) Filed: Aug. 24, 2023

(65) Prior Publication Data

US 2024/0371041 A1 Nov. 7, 2024

(30) Foreign Application Priority Data

May 5, 2023 (CN) ......................... 202321071882.1
May 30, 2023 (CN) ......................... 202321354763.7

(51) Int. Cl.
*G06T 7/80* (2017.01)

(52) U.S. Cl.
CPC ...................................... *G06T 7/85* (2017.01)

(58) Field of Classification Search
CPC .......... G03B 35/02; G03B 35/08; G02B 7/06; G02B 7/12; G02B 23/00–26; G02B 25/04; G02B 2027/0132
USPC .................................................. 359/480–482
See application file for complete search history.

(56) References Cited

U.S. PATENT DOCUMENTS 5,832,107 A * 11/1998 Choate ................. H04N 13/239 356/613
5,917,655 A * 6/1999 Lehnen .................... G02B 5/04 359/857
2011/0316975 A1* 12/2011 Tan ...................... G03B 17/565 348/46

(Continued)

FOREIGN PATENT DOCUMENTS

CA 2739136 A1 * 11/2011 ............. G03B 35/08
CN 105043259 A 11/2015
CN 106441135 A 2/2017

*Primary Examiner* — Jessica M Merlin

(57) ABSTRACT

The present invention discloses a virtual binocular detection device and a chip pin warpage detection method, and belongs to the technical field of chip detection. The virtual binocular detection device is configured to perform imaging detection on a to-be-detected object, and includes: a light source, two imaging components arranged side by side, and a light path deflection component positioned between the light source and the imaging component. The chip pin warpage detection method includes: establishing a binocular vision detection model; simultaneously collecting chip pin refraction imaging in an industrial lens by two vision cameras and sending the collected chip pin images to an industrial personal computer; and receiving and processing the chip pin images by the industrial personal computer to obtain a three-dimensional view of the chip pin, and determining whether the pin is warped. The present invention can accurately detect warpage of the chip pin.

11 Claims, 8 Drawing Sheets

(56) References Cited

U.S. PATENT DOCUMENTS

2014/0218478 A1* 8/2014 Lang .................... G02B 27/283
359/464

* cited by examiner

VIRTUAL BINOCULAR DETECTION DEVICE AND CHIP PIN WARPAGE DETECTION METHOD

TECHNICAL FIELD

The present invention relates to the technical field of chip detection, and in particular, to a virtual binocular detection device and a chip pin warpage detection method.

BACKGROUND

In the production process of SOT packaging and SOP packaging, a final step is that a product is required to be placed in a taping. In this case, machine vision is required to detect the appearance of the product to ensure product quality.

SOT series and SOP series semiconductor products are all chips with multiple pins, and a standing degree of the pin directly affects the quality of the chip.

The pin shape can only be seen by taking a relevant picture from the side. In the conventional technology, 2D appearance detection is usually used to detect the standing degree of pins. When the semiconductor packaging process enters the step of packaging in the taping (the product is placed in a small box similarly), the field of view of a side camera is blocked by the taping, the pins cannot be photographed, a top view can be photographed only from a front side, and a standing degree of the pin is indirectly determined through a length of the pin, consequently, the precision is low; due to the influence of the materials of the taping and the pins, the detection result is interfered by problems such as light reflection and black pin in the top view shot from the front side, false detection and missed detection are prone to occur.

For a binocular detection device, as described in Chinese patent with an application number of CN105043259B, this patent discloses a method for detecting an error of a rotating shaft of a numerical control machine tool based on binocular vision, where a high-resolution binocular vision system is used to collect position information of a mark point attached to a surface of a turntable of the machine tool. It can be seen from the drawings and the specification, the two cameras are obliquely arranged, so that a to-be-detected object can be detected in a three-dimensional dimension. However, the two cameras are arranged obliquely, which occupies more space, consequently, the detection device is larger in size and not compact enough in structure.

At the same time, calibration and operation of synchronous photographing of two cameras are complex, which is not beneficial to obtaining the three-dimensional appearance of a detected object. To reduce the difficulty of calibration and operation, a function of achieving binocular vision by using a single camera exists in the conventional technology, for example, Chinese patent with an application number of CN106441135A discloses a device and a method for synchronously measuring three-dimensional deformation and temperature of a single camera in a high-temperature environment. The single camera simulates two virtual cameras to photograph a to-be-detected object from different angles, so as to achieve binocular visual effect, however, it can be seen from the drawings that although the single camera can achieve the binocular vision effect, the field of view is also reduced, and the to-be-detected object with more sizes cannot be detected. Meanwhile, a single-camera binocular device needs to use a camera with higher pixels to meet the same detection accuracy requirement as that of the dual camera.

SUMMARY

1. Technical Problems to Be Resolved in the Present Invention

For the problems that a detection field of view of an existing single-camera binocular vision device is small and a size of the binocular vision device with two obliquely arranged cameras is too large, the present invention provides a virtual binocular detection device, two imaging components arranged side by side can form virtual binocular vision, the detection accuracy is improved, and the photographing field of view is increased; meanwhile, the imaging components arranged side by side are more compact in structure relative to the two obliquely arranged cameras.

The present invention further provides a chip pin warpage detection method, based on the virtual binocular detection device, a binocular vision detection model is established by using two imaging components arranged side by side and the light path deflection component, the binocular vision model obtains a three-dimensional view of the chip pin, and the warpage condition of the chip pin can be detected more accurately.

2. Technical Solution

To achieve the objective, the present invention provides a virtual binocular detection device for imaging detection of a to-be-detected object, including: a light source configured to generate light for imaging detection, two imaging components arranged side by side and configured to receive the light and perform imaging, and a light path deflection component positioned between the light source and the imaging component and configured to receive and refract the light reflected by a surface of the to-be-detected object so as to make main light parallelly emit into the imaging component.

Further, the light path deflection component includes symmetrically distributed prisms corresponding to the imaging component, the prism is wedge-shaped, and the prism has a deflection angle α of 10-20 degrees.

Further, the imaging component includes an industrial lens configured to receive light and a vision camera configured for imaging; the industrial lens uses a fixed-focus lens, and the industrial lens has a focal length F of 35-55 mm; and the vision camera uses a board level camera.

Further, the light source includes a blue light source and a red light source arranged in sequence, and the red light source is closer to the to-be-detected object; the light source includes a frame with an opening in the middle, and a plurality of light sources are arranged on the frame; and an opening of a frame of the red light source is greater than that of the blue light source.

Further, the virtual binocular detection device further includes a housing having an inner cavity, where the light source, the imaging component and the light path deflection component all are positioned within the inner cavity.

Further, the virtual binocular detection device further includes a base connected to the industrial lens and the light path deflection component, where an inner cavity of the base at least has an opening at one side for receiving light and a pressing plate arranged in the inner cavity for limiting the light path deflection component, the pressing plate divides the cavity into an imaging cavity configured to receive imaging light in cooperation with the industrial lens and a mounting cavity configured to mount the light path deflection component, and a through groove is arranged on the pressing plate for communicating the imaging cavity and the mounting cavity.

Further, the light path deflection component includes two combined triangular prisms, and light receiving surfaces of the two triangular prisms are combined into an inverted V shape and to form a top angle and two support angles of the light path deflection component.

Further, the inner cavity of the base has an inwardly protruding support step around the opening of the inner cavity, the support step supports the support angles connected to the light path deflection component; the pressing plate is provided with a reinforcing plate that divides the through groove into two parts, and the reinforcing plate is connected to the top corner of the light path deflection component; and one side that is of the reinforcing plate and faces the light path deflection component is provided with a limiting frame, and the limiting frame has a limiting surface matched with the top angle of the light path deflection component.

The present invention provides a chip pin warpage detection method based on the virtual binocular detection device, including the following steps:

S1: establishing a binocular vision detection model including the light source, two imaging components arranged side by side, the light path deflection component and the industrial personal computer, where the imaging component includes the industrial lens and the vision camera;

S2: controlling the light source to be turned on by the industrial personal computer, refracting a chip pin transmitted to the position right below the light source through the light path deflection component and then parallelly emitting into two corresponding industrial lenses, and simultaneously collecting chip pin images by the two vision cameras, where the light path deflection component has a deflection angle $\alpha$ of 10-20 degrees;

S3: simultaneously collecting chip pin refraction imaging in the industrial lens by two vision cameras and sending the collected chip pin images to an industrial personal computer, where the chip pin images include a first image and a second image of the chip pin; and S4: receiving and processing the chip pin images by the industrial personal computer to obtain a three-dimensional view of the chip pins, and determining whether the pin is warped according to the three-dimensional view of the chip pins.

Further, in the step S2, a blue light source is turned on, and the vision camera collects images of the chip pins; the red light source is turned on, and the vision camera collects surface and character images of a plastic package body of the chip; and the industrial personal computer simultaneously processes the separately collected images.

Further, the step S4 includes the following steps:

S41: processing the first image and the second image of the chip pin, performing binocular calibration and stereo correction on the first image and the second image of the chip pin, obtaining y coordinates of corresponding points of the first image and the second image of the chip pin after the stereo correction, determining x coordinates of the corresponding points by a matching algorithm, obtaining coordinates of corresponding feature points in the first image and the second image, and obtaining parallax of the first image and the second image of the chip pin;

S42: calculating three-dimensional coordinates of the chip pins by a conversion relationship among a world coordinate system, a camera coordinate system, an image physical coordinate system and an image pixel coordinate system in a camera imaging principle based on the parallax of the first image and the second image of the chip pin, and implementing two-dimensional to three-dimensional conversion of the chip pin images;

S43: obtaining three-dimensional coordinates of a pin root and a pin tip of each pin of the chip through the three-dimensional view of the chip pins;

S44: fitting the coordinate points of three-dimensional coordinates of the pin roots into a plane; and S45: determining whether the chip pin is warped according to a distance from each coordinate point of the pin tip to the fitting plane.

Further, the chip pin warpage detection method further includes the following steps:

S5: sending a detection result by the industrial personal computer to a machine, if the detection result is qualified, sending the chip to the next procedure through a taping by the machine, if the detection result is not qualified, sending a detection signal to the industrial personal computer again by the machine, and if the detection result is still not qualified after a plurality of times of circulations, sending alarm information by the machine.

3. Beneficial Effects

Compared with the existing well-known technology, using the technical solutions provided by the present invention have the following beneficial effects.

(1) According to the virtual binocular detection device provided by the present invention, a binocular vision technology is used to detect the standing degree of semiconductor products in the taping, which effectively avoids the problem of field of view interference of a conventional 2D method. Two imaging components are arranged side by side and cooperate with the light path deflection component to achieve virtual binocular vision, compared with a single-camera structure, this structure improves the accuracy of detection results, increases the field of view, is more compact than a conventional dual-camera structure obliquely arranged, and reduces the hardware volume.

(2) According to the virtual binocular detection device provided by the present invention, the prisms symmetrically distributed are used, so that light can be better refracted, the limitation of the deflection angle $\alpha$ can ensure that a sufficient quantity of light can be refracted and then parallelly emitted into the imaging components arranged side by side, and the used industrial lens and the vision camera can perform better imaging.

(3) According to the virtual binocular detection device provided by the present invention, a two-color light source of blue light and red light is used, and the red light source is close to a to-be-detected object. The pins of the chip can be illuminated by the blue light source, a surface of a chip plastic package can be illuminated by the red light source, and the pins and the plastic package can be imaged more clearly under the lighting of corresponding colors; therefore, this device can be compatible with a character detection function and a surface defect detection function of the surface of a plastic package body of the chip, and is beneficial to obtaining the tip data of the pins at two sides of the chip on the taping.

(4) According to the virtual binocular detection device provided by the present invention, the imaging component and the light path deflection component are connected into a whole through the base, and the light path deflection component is arranged in the inner cavity of the base, so that the sealing performance and the dustproof effect of the whole imaging part are improved. The integrated structural design may reduce errors caused by instability of the conventional light path deflection component, and further improves the stability and the integrity of an imaging system.

(5) According to the chip pin warpage detection method provided by the present invention, a binocular vision detection model is established by using two imaging components arranged side by side and the light path deflection component, a first side image and a second side image of a chip pin are converted into three-dimensional views, and then whether the pin is warped is determined, so that the problem of field of view interference of a conventional 2D method is effectively avoided. Compared with a single-camera 3D detection solution, this method has a larger field of view and a higher precision, and can detect chip products with almost all sizes in the market. Compared with a conventional obliquely arranged dual-camera 3D detection solution, the binocular vision detection model is more compact in structure and stronger in adaptability.

(6) According to the chip pin warpage detection method provided by the present invention, a mode of combining red light and blue light is used, so that the chip pin warpage detection method is compatible with a character detection function and a surface defect detection function of the surface of a plastic package body of the chip, and is beneficial to obtaining the tip data of the pins at a bottom of the chip on the taping. The deflection angle α is 10-20 degrees, and two images of the chip pins can be completely and clearly displayed on an industrial lens.

(7) According to the chip pin warpage detection method provided by the present invention, when the chip pins are warped, the pin tips are warped or pressed down significantly, and the pin roots basically remain stationary compared with the pin tips. Therefore, the three-dimensional coordinates of the pin tip and pin root of each pin of the chip are obtained, and on this basis, accurate detection of the warpage of the chip pin can be achieved.

BRIEF DESCRIPTION OF DRAWINGS

In the drawings, the size and the proportion do not represent the size and the proportion of an actual product. The drawings are merely illustrative, and certain non-essential elements or features have been omitted for clarity.

THE REFERENCE NUMBERS IN THE DRAWINGS ARE INDICATED AS FOLLOWS

1: light source; 101: blue light source; 102: red light source; 2: imaging component; 201: industrial lens; 202: vision camera; 3: light path deflection component; 301: triangular prism; 302: support angle; 303: top angle; 4: housing; 5: inner cavity; 6: to-be-detected object; 7: base; 8: pressing plate; 801: through groove; 802: reinforcing plate; 803: limiting frame; 9: adapter piece; 901: through hole; 902: flange; 903: annular boss; 904: arc-shaped groove; 10: imaging cavity; 11: mounting cavity; 12: support step; 13: positioning step; 14: opening; 15: limiting hole; and 16: sealing plate.

DETAILED DESCRIPTION OF EMBODIMENTS

To further understand the content of the present invention, the present invention will be described in detail with reference to the drawings and embodiments. What has been described herein is merely a preferred embodiment according to the present invention, and other ways of implementing the present invention will be apparent to those skilled in the art based on the preferred embodiment and are within the scope of the present invention.

After a semiconductor is processed, this semiconductor still needs to be encapsulated. To ensure encapsulation quality, defect detection still needs to be performed on a pin. For such detection, a binocular detection device is required. As the name implies, a device with two cameras is used, where if two cameras are arranged side by side, it is difficult to ensure that the optical axes of the two cameras are parallel, and because the chip detection in the taping requires high precision in use, the field of view of the chip is generally very small, two parallel cameras hardly have a public area and simultaneously photograph the to-be-detected chip. Therefore, generally, to perform three-dimensional detection on a chip pin, two cameras need to be obliquely arranged. However, the two cameras occupy more space in this oblique arrangement, consequently, the detection device is larger in size and not compact enough in structure. In actual use, it is often necessary to embed a detection camera in the mounted equipment, and even some equipment removes the original single camera and directly mounts a dual-camera equipment in the original position. With the miniaturization of the overall equipment processing and manufacturing, the space reserved for the detection camera is becoming increasingly compact.

Figure 1:
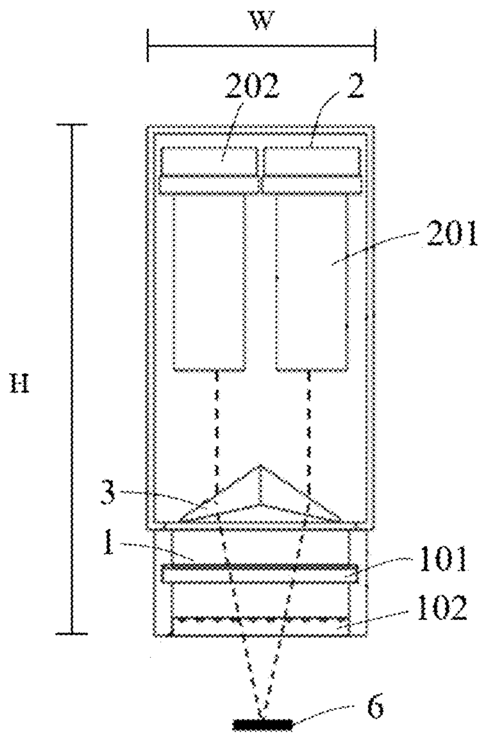
FIG. 1 is a schematic diagram (I) of a structure of a virtual binocular detection device.
Figure 2:
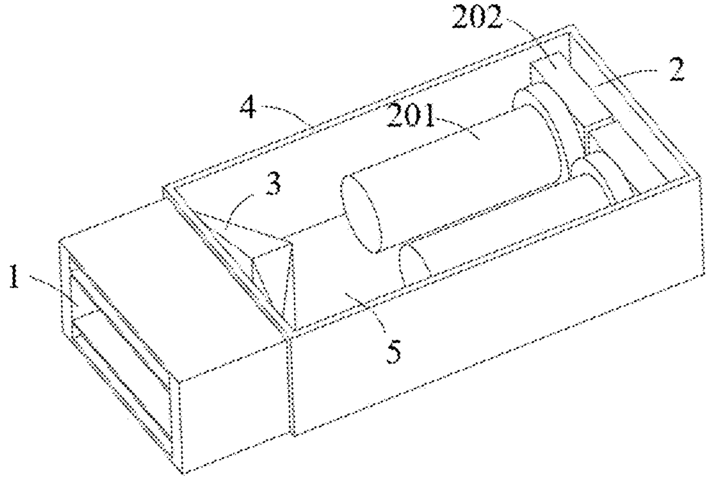
FIG. 2 is a schematic diagram (II) of a structure of a virtual binocular detection device.

Therefore, an embodiment proposes a virtual binocular detection device for imaging detection of a to-be-detected object 6. As shown in FIG. 1 and FIG. 2, this device mainly includes: a light source 1 configured to generate light for imaging detection, two imaging components 2 arranged side by side, and a light path deflection component 3 positioned between the light source 1 and the imaging components 2. In a possible embodiment, this device further includes a housing 4 having an inner cavity 5, the housing 4 may be made of aluminum, and the light source 1, the imaging component 2 and the light path deflection component 3 are arranged in the inner cavity 5 and arranged in a row. In addition, the light source 1 and the imaging component 2 are connected to an industrial personal computer. In another possible embodiment, the light source 1 is a separate element provided separately from the housing 4.

The light source 1 is positioned right below the light path deflection component 2, the light source 1 irradiates light on the to-be-detected object 6, and the to-be-detected object 6 is a chip. A middle part of the chip is a plastic package body, and pins are arranged on two sides of the plastic package body. The light source 1 includes a blue light source 101 and a red light source 102 arranged in sequence, and the red light source 102 is positioned right below the blue light source 101. Therefore, the red light source 102 is closer to the chip, so that the lighting range is smaller, and the chip plastic package body in the middle position can be illuminated. The blue light source is farther away from the chip, so that the lighting range is larger, and the chip pins on two sides of the plastic package body can be illuminated. Because the plastic package body and the pins of the chip are made of different materials, the reflection degrees of the red light and the blue light are different, where the blue light source 101 is selected to illuminate the pins of the chip according to the material, and the red light source 102 is selected to illuminate characters and defects on the surface of the plastic package body of the chip. Therefore, the light source 1 of this embodiment can be compatible with a character detection function and a surface defect detection function of the surface of the plastic package body of the chip, and is beneficial to obtaining the tip data of the pins at two sides of the chip on the taping. In a possible embodiment, the two-color light sources 1 each include a frame with an opening in the middle, several light sources are arranged on the frame, and the frame and the housing 4 can be made of aluminum.

The two imaging components 2 arranged side by side can receive light and perform imaging, and include industrial lenses 201 for receiving light and vision cameras 202 for imaging, where the two industrial lenses 201 and the vision cameras 202 are closely arranged and can be connected together through a connecting frame or separately arranged. The industrial lens 201 uses a fixed-focus lens, and the vision camera 202 uses a board level camera. The two industrial lenses 201 have the same parameter, a focal length F may be 35-55 mm, preferably 50 mm, and the minimum working distance WD is 200 mm. The two vision cameras 202 may be of the type Basler daA1920-160, with an outline size of 27 mm*27 mm, which may match a size of the housing 4.

The light path deflection component 3 positioned between the light source 1 and the imaging component 2 is configured to receive and refract the light reflected by the surface of the to-be-detected object 6 so as to make main light parallelly emit into the imaging component 2. The light path deflection component includes prisms symmetrically distributed and correspond to the imaging component 2, and the prisms can be symmetrical refraction wedge-shaped prisms. In a possible embodiment, the light path deflection device may use a colorless optical glass material H-K9L, with a refractive index n equal to 1.5168 and an Abbe number v equal to 64.1987.

Figure 3:
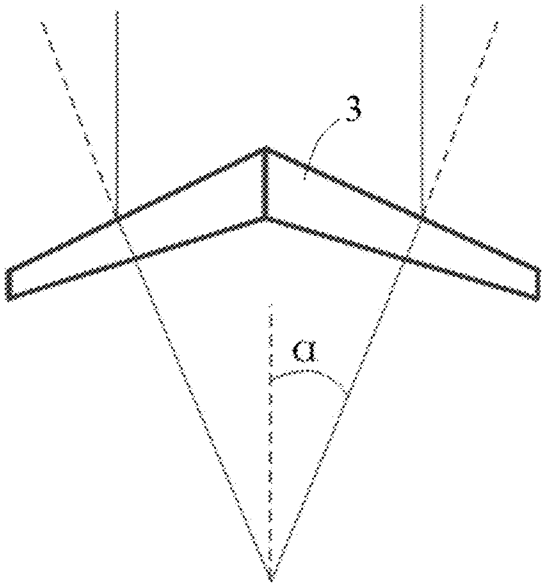
FIG. 3 is a schematic diagram of a structure of a light path deflection component.

According to the law of refraction, a in FIG. 3 is a light path deflection angle of the light path deflection component 3, which is 10-20 degrees, specifically 10°, 12.5°, 15°, 17.5°, and 20°, where 17.5° is preferred in this embodiment.

In addition, in a possible embodiment, a width W and a height H of the housing 4, or the combination of the housing 4 and the single light source 1 are equal to 60 mm and 120 mm, respectively.

In this embodiment, through the cooperation of the light path deflection component 3 and the imaging component 2, the pins of a semiconductor chip can be detected in three-dimensional dimension without obliquely arranging the two imaging components 2, and meanwhile, characters and defects on the plastic package body can be detected, so that an integral volume of the detection device is reduced, and the overall structure is more compact. A binocular detection device of a single camera concentrates two images into one camera, which inevitably limits a size of a detected object. A binocular detection device of a dual camera can enable two images to be collected by two cameras, so that a size of a detected object is larger. In the field of chips, the dual-camera binocular detection device can almost detect chips with all sizes on the market.

In addition, to ensure the stability and the dust resistance of the imaging part of the virtual binocular detection device, as shown in FIGS. 4-9, a base 7 connected to the industrial lens 201 and the light path deflection component 3 is further mounted inside the housing 4, and the industrial lens 201, the light path deflection component 3 and the base 7 together form a dual-lens imaging module. The base 7 may be made of aluminum or steel, and the vision camera 201 is connected to the industrial lens 202 through a c-interface without an air gap.

Figure 4:
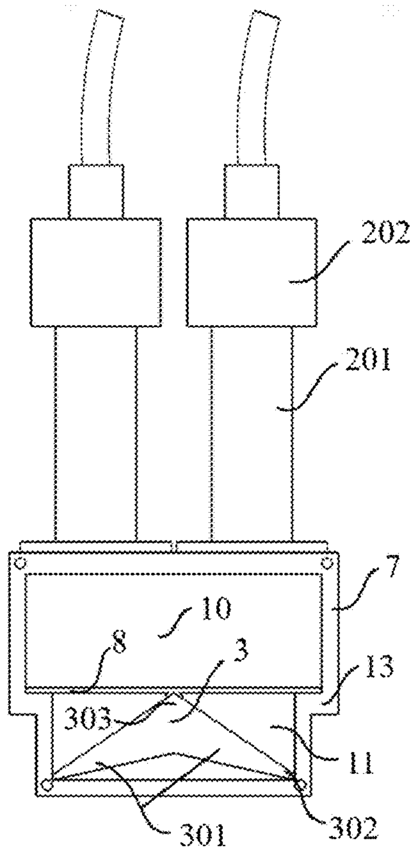
FIG. 4 is a schematic diagram (I) of a structure of a dual-lens imaging module.
Figure 5:
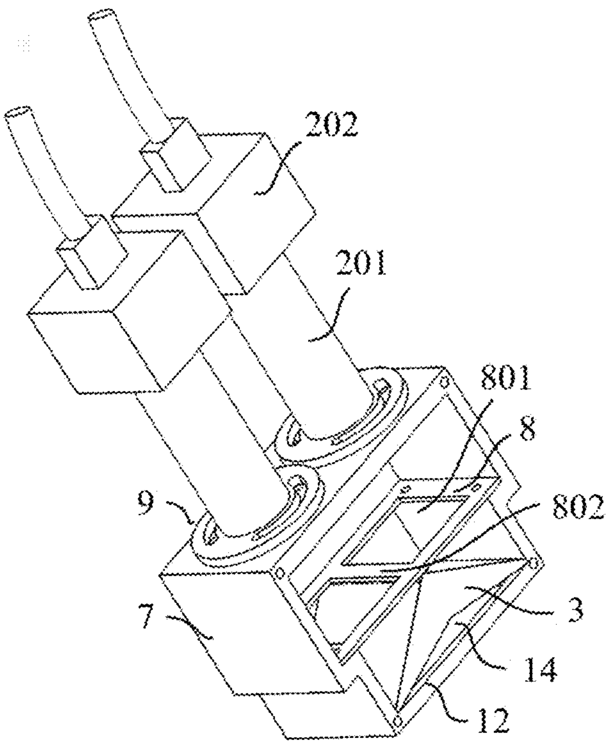
FIG. 5 is a schematic diagram (II) of a structure of a dual-lens imaging module.

As shown in FIGS. 4 and 5, a cavity of the base 7 has an opening 14 at one side for receiving light and a pressing plate 8 arranged in the cavity for limiting the light path deflection component 3. Specifically, the cavity of the base 7 has a positioning step 13, an edge portion of the positioning step 13 on a step surface supports and connects the pressing plate 8, specifically, a threaded connection or the like may be used. The pressing plate 8 may cooperate with the base 7 to clamp and fix the light path deflection component 3, the cavity of the base 7 further has an inwardly protruding support step 12 around the opening 14, and the support step 12 supports and connects the light path deflection component 3. In addition, the pressing plate 8 divides the cavity into the imaging cavity 10 that cooperates with industrial lens 201 to receive imaging light and the mounting cavity 11 configured to mount the light path deflection component 3. The pressing plate 8 is provided with a through groove 801, the through groove 801 can be a rectangular or circular light through hole to communicate the imaging cavity 10 and the mounting cavity 11. The light emitted from the opening 14 of the cavity can be refracted by the light path deflection component 3, and then enter the imaging component 2 through the imaging cavity 10. This structural design connects the imaging component 2 and the light path deflection component 3 into a whole through the base 7, and the light path deflection component 3 is arranged in the cavity of the base 7, so that the sealing performance and the dustproof effect of the whole imaging part are improved. The integrated structural design may reduce errors caused by instability of the conventional prism component, and further improves the stability and the integrity of an imaging system.

Figure 6:
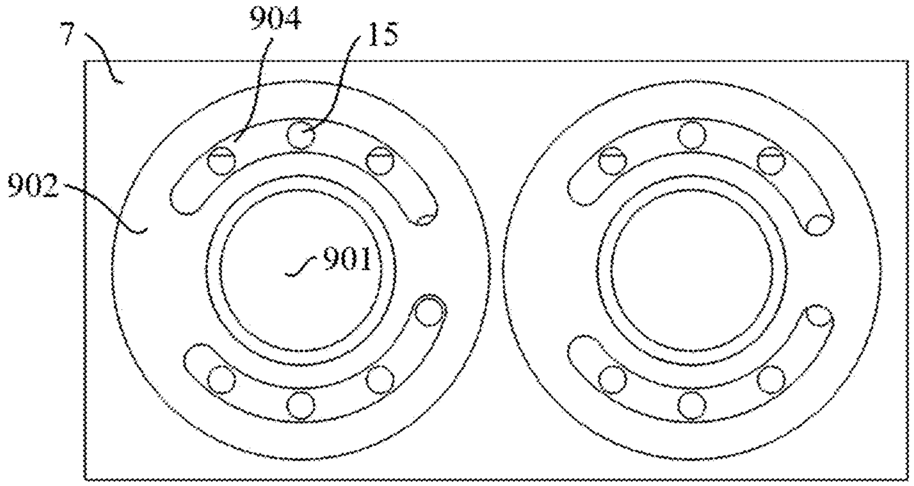
FIG. 6 is a schematic diagram of a structure of a connection between an adapter piece and a base.
Figure 8:
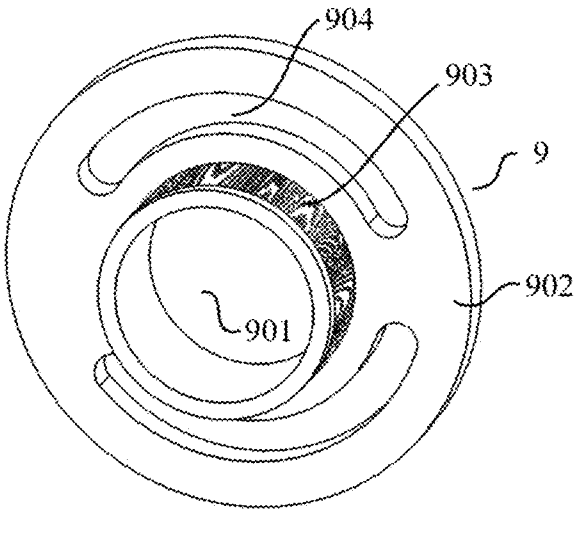
FIG. 8 is a schematic diagram of a structure of an adapter piece.

In a possible embodiment, the base 7 is connected to the industrial lens 201 through the adapter piece 9, as shown in FIG. 5, FIG. 6, and FIG. 8, through holes 901 are formed in both the base 7 and the adapter piece 9 in cooperation with the industrial lens 201, the through hole 901 is mainly used to guide light in the imaging cavity 10 into the industrial lens 201, the adapter piece 9 has a flange 902 connected to the base 7, an annular boss 903 in threaded connection with the industrial lens 201 is provided on the flange 902, specifically, an external thread may be provided on an outer side of a circumference of the annular boss 903, an internal thread is provided at a corresponding end of the industrial lens 201, and the arrangement of the adapter piece 9 can improve the integrity of the connection between the industrial lens 201 and the base 7. In addition, to prevent the adapter piece 9 from positional deviation on the base 7, the flange 902 is provided with an arc-shaped groove 904, the base 7 is provided with a plurality of limiting holes 15 corresponding to the arc-shaped groove 904, the adapter piece 9 and the base 7 are connected by a plug connector penetrating through the arc-shaped groove 904 and the limiting holes 15, the plug connector can be of a screw or bolt structure and can press an upper surface of the flange 902, so that the adapter piece 9 and the base 7 can be fixed together, and the adapter piece 9 can be better prevented from positional deviation.

In a possible embodiment, as shown in FIGS. 4 and 5, the light path deflection component 3 includes two combined triangular prisms 301, the light receiving surfaces of the two triangular prisms 301 are combined into an inverted V shape and to form a top angle 303 and two support angles 302 of the light path deflection component 3, and the two triangular prisms 301 are clamped and fixed by the pressing plate 8 and a bottom of the base 7. The two triangular prisms 301 are combined to form a design of the light path deflection component 3, which can better cooperate with the two sets of imaging components 2 for imaging, and the two supporting angles 302 formed and connected to the support step 12 of the base 7 can better limit a position of the light path deflection component 3.

Figure 7:
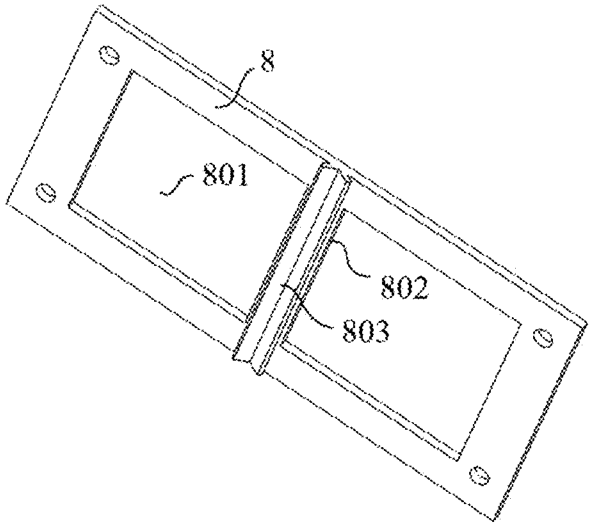
FIG. 7 is a schematic diagram of a structure of a pressing plate and a limiting frame.

Specifically, as shown in FIGS. 5 and 7, the pressing plate 8 has a reinforcing plate 802 dividing the through groove 801 into two parts, and the reinforcing plate 802 is connected to the top corner 303 of the light path deflection component 3, so that the base 7 and the pressing plate 8 cooperate to clamp and fix the light path deflection component 3, and light entering the imaging cavity 10 from the mounting cavity 11 is not affected. To better limit the position of the light path deflection component 3, as shown in FIG. 7, a limiting frame 803 is provided on one side that is of the reinforcing plate 802 and that faces the light path deflection component 3, and the limiting frame 803 has a limiting surface matched with the top angle 303 of the light path deflection component 3, so that the light path deflection component 3 can be prevented from positional deviation in the mounting cavity 11, the working stability of the light path deflection component 3 is improved, and the stability of the whole imaging of the imaging module is improved. In addition, to prevent the limiting frame 803 and the light path deflection component 3 from abrasion due to friction, a foam layer is arranged between the limiting frame 803 and the top angle 303 of the light path deflection component 3, so that abrasion between the limiting frame and the top angle of the light path deflection component is reduced, and the service life of the equipment is prolonged.

Figure 9:
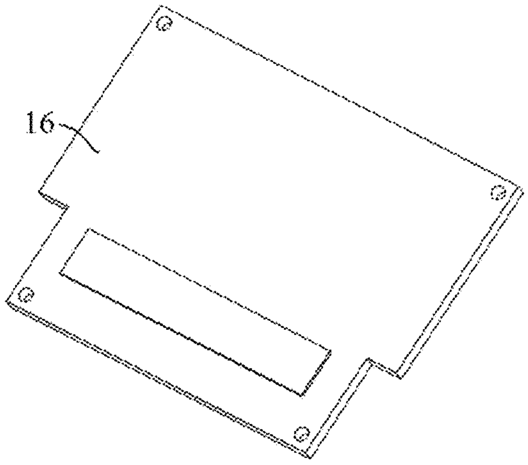
FIG. 9 is a schematic diagram of a structure of a sealing plate.
Figure 10:
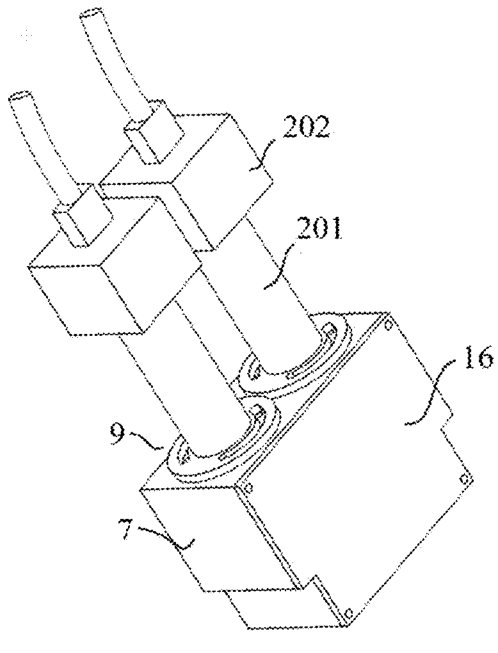
FIG. 10 is a schematic diagram of a structure of a dual-lens imaging module after a sealing plate is arranged.

In addition, to facilitate the assembly of parts in the cavity of the base 7, as shown in FIGS. 9 and 10, a sealing plate 16 for sealing the cavity is detachably connected to one side that is of the base 7 and that is adjacent to the opening 14, so that the assembly, the maintenance and the replacement of parts in normal use can be facilitated. To prevent the sealing plate 16 from being squeezed to damage the light path deflection component 3, a foam structure may be further provided inside the sealing plate 16.

Based on the structure of the virtual binocular detection device of the foregoing embodiment, an embodiment provides a chip pin warpage detection method, which can detect the standing degree of the chip in the taping by using a binocular vision technology and effectively avoids the problem of field of view interference of a conventional 2D detection method. Compared with a single-camera 3D detection solution, the method has a larger field of view with a higher precision; and compared with a conventional obliquely arranged dual-camera 3D detection solution, the virtual binocular detection device related by the method is more compact in structure and stronger in adaptability.

To facilitate an understanding of embodiments of the present invention, the binocular vision technology is briefly described below:

the binocular vision technology is a method for obtaining three-dimensional geometric information of an object by obtaining two images of the detected object from different positions by using imaging equipment based on a parallax principle and calculating a position deviation between corresponding points of the images.

Figure 11:
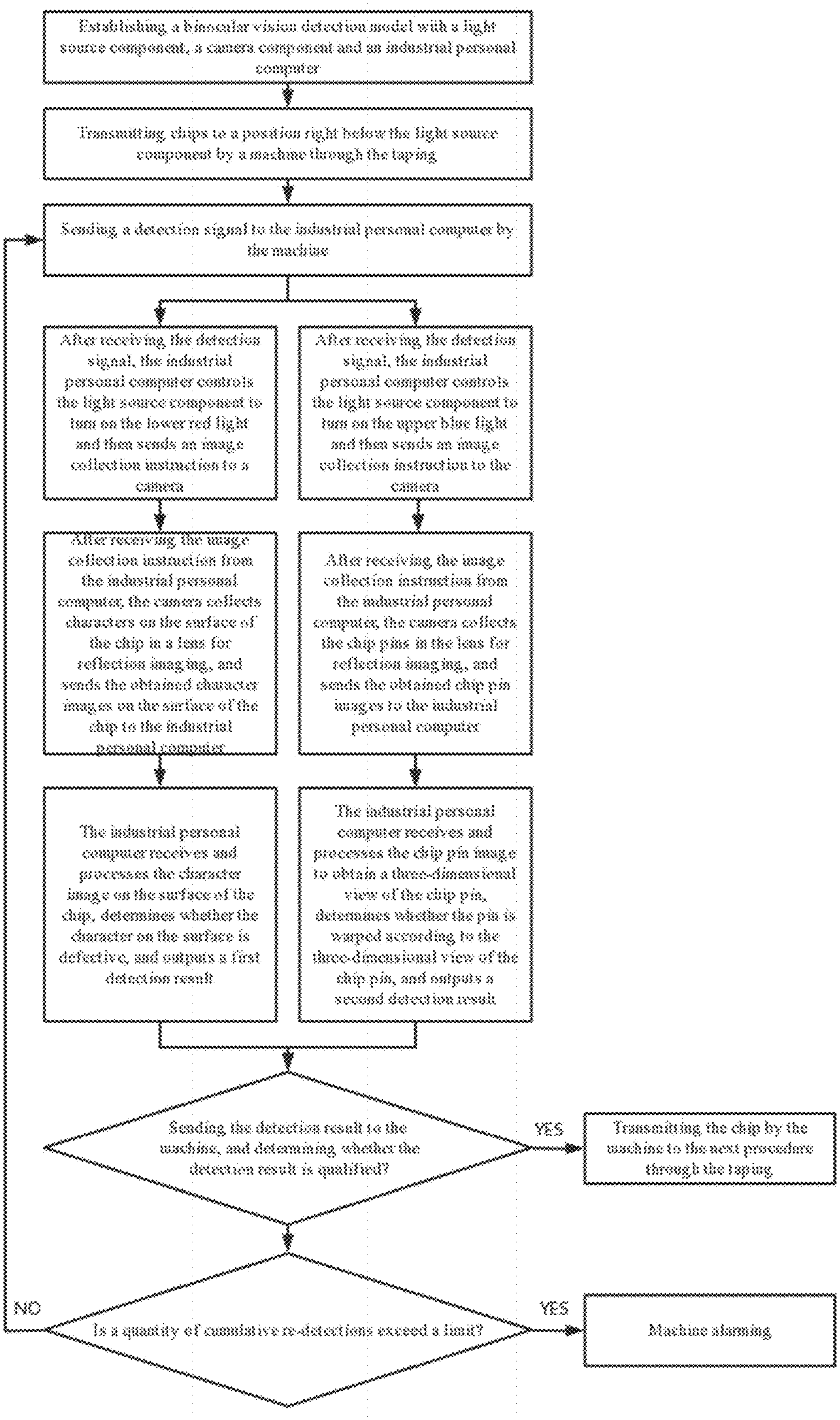
FIG. 11 is a schematic flowchart of a chip pin warpage detection method.

As shown in FIG. 11, an embodiment further provides a chip pin warpage detection method, including the following steps.

S1: Establishing a binocular vision detection model with the light source 1, two imaging components 2 arranged side by side, the light path deflection component 3, the housing 4 and the industrial personal computer, where the imaging component 2 includes the industrial lens 201 and the vision camera 202.

S2: transmitting chips to a position right below the two-color light sources 1 by a machine through the taping, and sending a detection signal to the industrial personal computer by the machine. After receiving the detection signal, the industrial personal computer controls the two-color light sources 1 to be separately turned on, and then sends an image collection instruction to the two vision cameras 202 arranged side by side. The red light source 102 is turned on, the vision camera 202 collects characters on the surface of the chip in the industrial lens 201 for reflection imaging, and sends the obtained character images on the surface of the chip to the industrial personal computer; and the blue light source 101 is turned on, the vision camera 202 collects the chip pins in the industrial lens 201 for reflection imaging, and sends the obtained chip pin images to the industrial personal computer. The light path deflection component 3 refracts the light reflected by the chip and then parallelly emits the light into the two corresponding industrial lenses 201, and the two vision cameras 202 simultaneously collect the images of the chip pins.

In this step, the vision cameras 202 are connected to the industrial personal computer through the trigger line and the data line, and after the industrial personal computer sends an image collection instruction, the two vision cameras 202 simultaneously receive signals and make a snap-shot response.

In this step, the two-color light source 1 is used in cooperation with the two vision cameras 202, so that the first image and the second image are clearer, the upper blue light source 101 enables the pin area to be more prominent, and the lower red light source 102 enables the characters and the surfaces of the chip plastic package bodies to be clearer and more distinguishable.

In this step, to completely and clearly present two images of the chip pins, in an embodiment of the present invention, the two vision cameras 202 are fixed side by side, the light path deflection component 3 is positioned below the two industrial lenses 201, and the light path deflection component 3 has a deflection angle α of 17.5°.

S3: After receiving the image collection instruction of the industrial personal computer, the two vision cameras 202 simultaneously collects the chip pins in the two industrial lenses 201 for refraction imaging and send the obtained chip pin images to the industrial personal computer.

In this step, the chip pin images include a first image and a second image of the chip pin.

S4: Receiving and processing the chip pin images by the industrial personal computer to obtain a three-dimensional view of the chip pins, determining whether the pin is warped according to the three-dimensional view of the chip pins, and outputting a second result. The industrial personal computer receives and processes the character image on the surface of the chip, determines whether the character on the surface is defective, and outputs a first result. After the first result and the second result are qualified, the machine transmits the chip to the next procedure through the taping.

Specifically, the method for processing the chip pin images by the industrial personal computer to obtain the three-dimensional view of the chip pin includes the following steps:

S41: Processing the first image and the second image of the chip pin, calculating coordinates of corresponding feature points in the first image and the second image, and obtaining parallax of the first image and the second image of the chip pin.

In this step, processing the first image and the second image of the chip pin includes: after binocular calibration and stereo correction are performed on the first image and the second image of the chip pin, the points on the first image and the second image of the chip pin are subjected to feature matching, and parallax of the first image and the second image of the chip pin is obtained.

Specifically, after the chip pin is subjected to stereo correction, corresponding points of the first image and the second image of the chip pin have the same y coordinate, an x coordinate is determined through a matching algorithm, and feature matching is performed on the corresponding points of the first image and the second image of the chip pin, so that the one-to-one correspondence between the points of the first image and the second image of the chip pin is achieved. It should be noted that x and y are coordinates of a pixel coordinate system of an image, and an upper left corner is taken as an origin, a lateral direction is taken as the x direction, and a longitudinal direction is taken as the y direction.

Figure 13:
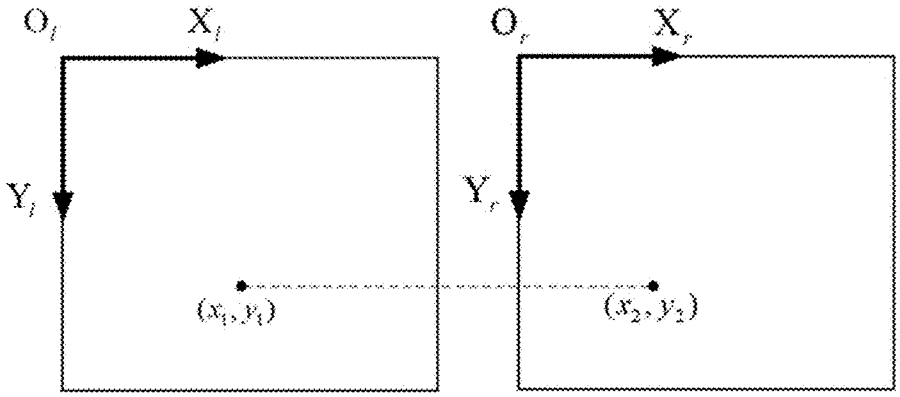
FIG. 13 is a schematic diagram of a coordinate system of corresponding feature points.

The above coordinates are described with reference to FIG. 13, where in the first image, $O_1X_1Y_1$ is taken as a coordinate system, the origin $O_1$ is at an upper left corner of the first image, the lateral direction is $X_1$ direction, and the longitudinal direction is $Y_1$ direction. Similarly, in the second image, $O_rX_rY_r$ is taken as a coordinate system, the origin $O_r$ is at an upper left corner of the second image, the lateral direction is $X_r$ direction, and the longitudinal direction is $Y_r$ direction. The letters 1 and r have no special meaning and are used merely markers. The same point on the chip pin has coordinates $(x_1,y_1)$ on the first image and $(x_2,y_2)$ on the second image. After the stereo correction, the corresponding points of the first image and the second image have the same y coordinate, that is, $y_1=y_2$, and then $x_1$ of the first image of the chip pin is searched for the corresponding $x_2$ on the second image through a feature matching algorithm, that is, the one-to-one correspondence between the points of the first image and the second image of the chip pin is achieved.

S42: Obtaining a three-dimensional view of the chip pins by a camera imaging principle based on the parallax of the first image and the second image of the chip pins.

This step is implemented by a defect detection software. Specifically, the three-dimensional coordinates of the chip pins are calculated by using a conversion relation between the binocular calibration results of the first image and the second image of the chip pins and four coordinate systems in the camera imaging principle, thereby implementing two-dimensional to three-dimensional conversion of the chip pin images. The four coordinate systems include a world coordinate system, a camera coordinate system, an image physical coordinate system, and an image pixel coordinate system.

Specifically, the step of determining whether the pin is warped according to a three-dimensional view of the chip pins includes the following steps:

S43: Obtaining three-dimensional coordinates of a pin root and a pin tip of each pin of the chip through the chip pin three-dimensional view.

It should be noted that when the chip pins are warped, the pin tips are warped or pressed down significantly, and the pin roots basically remain stationary compared with the pin tips. Therefore, the three-dimensional coordinates of the pin tip and pin root of each pin of the chip are obtained, and on this basis, accurate detection of the warpage of the chip pin can be achieved.

S44: Fitting the coordinate points of three-dimensional coordinates of the pin roots into a plane.

Figure 12:
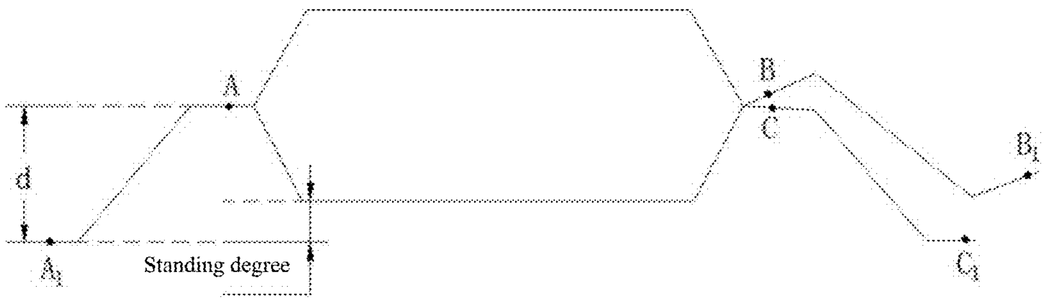
FIG. 12 is a schematic flowchart of a detection principle of a chip pin warpage detection method.

Referring to FIG. 12, FIG. 12 is a schematic diagram illustrating a detection principle according to an embodiment of the present invention.

During specific implementation, as shown in FIG. 12, three-dimensional coordinates A, B, and C of each pin root and three-dimensional coordinates $A_1$, $B_1$, and $C_1$ of each pin tip are obtained, and the three-dimensional coordinates A, B and C of the pin root are fitted to a plane.

S45: Determining whether the chip pin is warped according to a distance from each coordinate point of the pin tip to the fitting plane.

During specific implementation, the coordinates A and $A_1$, B and $B_1$, C and $C_1$ are on the same pin. The pins in the group B are warped, where although the $B_1$ point warps very high, the B point warps very small, so three-dimensional coordinates of points A, B, and C are used in the specific detection process to fit a plane, the distances from the points $A_1$, $B_1$, and $C_1$ to this fitting plane are separately calculated, and finally, the distance from the point $B_1$ to the fitting plane exceeds a preset determination standard, and the current product is determined as defective.

In FIG. 12, a distance between the pin tip $A_1$ of the pin and a bottom surface of the plastic package body is a standing degree, and a distance d between the coordinates A and $A_1$ represents a warpage height.

In this step, the determination standard is set based on different products, and the determination of different products can be achieved by setting the distance parameter from each coordinate point of the pin tip to the fitting plane of the pin root.

Further, the detection method further includes the following steps:

S5: Sending a detection result by the industrial personal computer to a machine, if the detection result is qualified, sending the chip to the next procedure through a taping by the machine, if the detection result is not qualified, sending a detection signal to the industrial personal computer again by the machine, and if the detection result is still not qualified after a plurality of times of circulations, sending alarm information by the machine.

During specific implementation, after completing detection, the industrial personal computer sends a detection result to the machine, if the detection result is an OK signal, the machine continues to operate, if the detection result is an NG signal, the machine sends a detection signal again, the industrial personal computer controls the detection system to collect the images again for detection and sends a detection result signal, and if there is still no NG signal after a plurality of times of circulations, the machine sends alarm information, and chips in the current taping are manually picked out. The repeated image collection detection after NG is used to prevent the image collection from not meeting the detection requirement in the vibration process of the machine, thereby reducing the false detection probability caused by vibration. The OK signal represents that the detection result is qualified, and the NG signal represents that the detection result is unqualified.

It should be noted that the detection method of the embodiment of the present invention may be used to detect a pin of a chip in the taping. However, this detection method is not limited to a chip in a taping, and is also applicable to the chips in other environments.

According to the detection method provided by the embodiment of the present invention, a binocular vision solution is used, and the side imaging is performed on the chip pin by the dual camera, so that the pin warpage height can be accurately detected, and whether the chip pin warps can be accurately determined. Moreover, compared with the single-camera binocular detection device, the detection result of the dual-camera is more accurate.

EXAMPLE

The testing result of the foregoing dual-camera virtual binocular detection device on the TSSOP28 chip of 10 mm*6 mm is taken as an example, and the testing result of the conventional single-camera virtual binocular detection device on the TSSOP28 chip of 10 mm*6 mm is taken as a comparative example, and the warpage results are sequentially detected on the pins on upper and lower edges of the same chip under 15 different poses of the chip. The detection results are repeated for 15 different positions of the same chip, and the purpose is to simulate angular position offset of the position of the chip photographed when a field machine vibrates.

In the following tables, 15 poses are represented by serial numbers 1 to 15; the dual camera represents a dual-camera virtual binocular detection device, and the single camera represents a single-camera virtual binocular detection device.

In the tables, the average value represents an average value of 15 detection results of the same pin of the detected chip in 15 different poses, and the average value is used to compare with a third-party detection result (about 0.5 mm), and the closer to the third-party detection result, the more accurate the detection result. The detection result is a distance parameter from a coordinate point of the pin tip of each pin to a fitting plane of the pin root.

In the tables, MAX-MIN represents a dynamic repeatability error of the system, that is, a value obtained by subtracting a minimum detection result from a maximum detection result of the same pin of the detected chip in 15 poses, and the smaller the result value, the more stable the system.

TABLE 1

Comparison table of detection results of pin1 on an upper edge (unit: mm)

| Pose | Dual camera | Single camera |
|---|---|---|
| 1 | 0.492563 | 0.428945 |
| 2 | 0.490466 | 0.435093 |
| 3 | 0.487296 | 0.425130 |
| 4 | 0.490757 | 0.430931 |
| 5 | 0.492592 | 0.427651 |
| 6 | 0.494442 | 0.428145 |
| 7 | 0.495046 | 0.425115 |
| 8 | 0.495209 | 0.424353 |
| 9 | 0.493393 | 0.426537 |
| 10 | 0.494784 | 0.424795 |
| 11 | 0.494696 | 0.420522 |
| 12 | 0.496299 | 0.431783 |
| 13 | 0.496791 | 0.435398 |
| 14 | 0.495089 | 0.428630 |
| 15 | 0.494311 | 0.430132 |
| Average value | 0.493582 | 0.428211 |
| MAX − MIN | 0.009495 | 0.014876 |

It can be seen from Table 1 that the average value of the detection results of the dual camera of the pin1 on the upper edge is 0.493582 mm, the average value of the detection results of the single camera on this pin is 0.428211 mm, and the average value of the detection results of the dual camera is closer to 0.5 mm, therefore, the detection results are more accurate. The MAX-MIN value of the detection result of the dual camera is 0.009495 mm, the MAX-MIN value of the detection result of the single camera is 0.014876 mm, the dynamic repeatability error of the dual camera is smaller, and the system of the dual camera is more stable.

TABLE 2

Comparison table of detection results of pin2 on an upper edge (unit: mm)

| Pose | Dual camera | Single camera |
|---|---|---|
| 1 | 0.494569 | 0.445414 |
| 2 | 0.496114 | 0.455734 |
| 3 | 0.494862 | 0.450854 |
| 4 | 0.494437 | 0.447970 |
| 5 | 0.498944 | 0.442840 |
| 6 | 0.499119 | 0.441547 |
| 7 | 0.495646 | 0.445796 |
| 8 | 0.500262 | 0.450184 |
| 9 | 0.499798 | 0.444184 |
| 10 | 0.498285 | 0.446589 |
| 11 | 0.493247 | 0.441546 |
| 12 | 0.494723 | 0.449582 |
| 13 | 0.488737 | 0.459882 |
| 14 | 0.495039 | 0.448767 |
| 15 | 0.498104 | 0.457096 |
| Average value | 0.496126 | 0.448532 |
| MAX − MIN | 0.011525 | 0.018336 |

It can be seen from Table 2 that the average value of the detection results of the dual camera of the pin2 on the upper edge is 0.496126 mm, the average value of the detection results of the single camera on this pin is 0.448532 mm, and the average value of the detection results of the dual camera is closer to 0.5 mm, therefore, the detection results are more accurate. The MAX-MIN value of the detection result of the dual camera is 0.011525 mm, the MAX-MIN value of the detection result of the single camera is 0.018336 mm, the dynamic repeatability error of the dual camera is smaller, and the system of the dual camera is more stable.

TABLE 3

Comparison table of detection results of pin3 on an upper edge (unit: mm)

| Pose | Dual camera | Single camera |
|---|---|---|
| 1 | 0.502300 | 0.475369 |
| 2 | 0.498407 | 0.479167 |
| 3 | 0.498838 | 0.470560 |
| 4 | 0.502378 | 0.477111 |
| 5 | 0.499727 | 0.468461 |
| 6 | 0.496045 | 0.472627 |
| 7 | 0.500473 | 0.476442 |
| 8 | 0.499386 | 0.473705 |
| 9 | 0.506201 | 0.477363 |
| 10 | 0.497133 | 0.464316 |
| 11 | 0.500185 | 0.471341 |
| 12 | 0.501167 | 0.477691 |
| 13 | 0.495289 | 0.484635 |
| 14 | 0.491293 | 0.478942 |
| 15 | 0.491831 | 0.476749 |
| Average value | 0.498710 | 0.474965 |
| MAX − MIN | 0.014908 | 0.020319 |

It can be seen from Table 3 that the average value of the detection results of the dual camera of the pin3 on the upper edge is 0.498710 mm, the average value of the detection results of the single camera on this pin is 0.474965 mm, and the average value of the detection results of the dual camera is closer to 0.5 mm, therefore, the detection results are more accurate. The MAX-MIN value of the detection result of the dual camera is 0.014908 mm, the MAX-MIN value of the detection result of the single camera is 0.020319 mm, the dynamic repeatability error of the dual camera is smaller, and the system of the dual camera is more stable.

TABLE 4

Comparison table of detection results of pin4 on an upper edge (unit: mm)

| Pose | Dual camera | Single camera |
|---|---|---|
| 1 | 0.500120 | 0.485374 |
| 2 | 0.502632 | 0.488549 |
| 3 | 0.497095 | 0.491977 |
| 4 | 0.501836 | 0.480248 |
| 5 | 0.501719 | 0.479687 |
| 6 | 0.503356 | 0.486899 |
| 7 | 0.499489 | 0.487758 |
| 8 | 0.502443 | 0.482155 |
| 9 | 0.500849 | 0.485271 |
| 10 | 0.501287 | 0.481712 |
| 11 | 0.509482 | 0.492320 |
| 12 | 0.498922 | 0.491978 |
| 13 | 0.499560 | 0.491942 |
| 14 | 0.502008 | 0.483383 |
| 15 | 0.498905 | 0.483475 |
| Average value | 0.501314 | 0.486182 |
| MAX − MIN | 0.012387 | 0.012633 |

It can be seen from Table 4 that the average value of the detection results of the dual camera of the pin4 on the upper edge is 0.501314 mm, the average value of the detection results of the single camera on this pin is 0.486182 mm, and the average value of the detection results of the dual camera is closer to 0.5 mm, therefore, the detection results are more accurate. The MAX-MIN value of the detection result of the dual camera is 0.012387 mm, the MAX-MIN value of the detection result of the single camera is 0.012633 mm, the dynamic repeatability error of the dual camera is smaller, and the system of the dual camera is more stable.

TABLE 5

Comparison table of detection results of pin5 on an upper edge (unit: mm)

| Pose | Dual camera | Single camera |
|---|---|---|
| 1 | 0.491439 | 0.499308 |
| 2 | 0.495779 | 0.500513 |
| 3 | 0.498960 | 0.503894 |
| 4 | 0.495097 | 0.499315 |
| 5 | 0.499780 | 0.494096 |
| 6 | 0.494174 | 0.498275 |
| 7 | 0.494155 | 0.497378 |
| 8 | 0.499293 | 0.495919 |
| 9 | 0.495645 | 0.495160 |
| 10 | 0.499463 | 0.493765 |
| 11 | 0.498396 | 0.501436 |
| 12 | 0.496775 | 0.504509 |
| 13 | 0.494919 | 0.506464 |
| 14 | 0.497878 | 0.499604 |
| 15 | 0.503533 | 0.493984 |
| Average value | 0.497019 | 0.498908 |
| MAX − MIN | 0.012094 | 0.012699 |

It can be seen from Table 5 that the average value of the detection results of the dual camera of the pin5 on the upper edge is 0.497019 mm, the average value of the detection results of the single camera on this pin is 0.498908 mm, and the average value of the detection results of the dual camera is closer to 0.5 mm, therefore, the detection results are more accurate. The MAX-MIN value of the detection result of the dual camera is 0.012094 mm, the MAX-MIN value of the detection result of the single camera is 0.012699 mm, the dynamic repeatability error of the dual camera is smaller, and the system of the dual camera is more stable.

TABLE 6

Comparison table of detection results of pin6 on an upper edge (unit: mm)

| Pose | Dual camera | Single camera |
|---|---|---|
| 1 | 0.498396 | 0.507813 |
| 2 | 0.497002 | 0.509100 |
| 3 | 0.498616 | 0.510483 |
| 4 | 0.502306 | 0.496297 |
| 5 | 0.503680 | 0.496047 |
| 6 | 0.505199 | 0.502402 |
| 7 | 0.499694 | 0.506187 |
| 8 | 0.500689 | 0.504249 |
| 9 | 0.498166 | 0.504329 |
| 10 | 0.502033 | 0.493945 |
| 11 | 0.498353 | 0.505371 |
| 12 | 0.503983 | 0.504464 |
| 13 | 0.502513 | 0.515600 |
| 14 | 0.501038 | 0.506086 |
| 15 | 0.506155 | 0.503653 |
| Average value | 0.501188 | 0.504402 |
| MAX − MIN | 0.009153 | 0.021655 |

It can be seen from Table 6 that the average value of the detection results of the dual camera of the pin6 on the upper edge is 0.501188 mm, the average value of the detection results of the single camera on this pin is 0.504402 mm, and the average value of the detection results of the dual camera is closer to 0.5 mm, therefore, the detection results are more accurate. The MAX-MIN value of the detection result of the dual camera is 0.009153 mm, the MAX-MIN value of the detection result of the single camera is 0.021655 mm, the dynamic repeatability error of the dual camera is smaller, and the system of the dual camera is more stable.

TABLE 7

| Comparison table of detection results of pin7 on an upper edge (unit: mm) | | |
|---|---|---|
| Pose | Dual camera | Single camera |
| 1 | 0.503128 | 0.500823 |
| 2 | 0.498764 | 0.511006 |
| 3 | 0.502556 | 0.516411 |
| 4 | 0.500977 | 0.501747 |
| 5 | 0.500782 | 0.508520 |
| 6 | 0.499531 | 0.514348 |
| 7 | 0.501453 | 0.510450 |
| 8 | 0.501718 | 0.501908 |
| 9 | 0.497994 | 0.504419 |
| 10 | 0.503542 | 0.500144 |
| 11 | 0.505854 | 0.514576 |
| 12 | 0.503889 | 0.511443 |
| 13 | 0.506762 | 0.516185 |
| 14 | 0.502886 | 0.514158 |
| 15 | 0.507866 | 0.501476 |
| Average value | 0.502513 | 0.508508 |
| MAX − MIN | 0.009872 | 0.016267 |

It can be seen from Table 7 that the average value of the detection results of the dual camera of the pin7 on the upper edge is 0.502513 mm, the average value of the detection results of the single camera on this pin is 0.508508 mm, and the average value of the detection results of the dual camera is closer to 0.5 mm, therefore, the detection results are more accurate. The MAX-MIN value of the detection result of the dual camera is 0.009872 mm, the MAX-MIN value of the detection result of the single camera is 0.016267 mm, the dynamic repeatability error of the dual camera is smaller, and the system of the dual camera is more stable.

TABLE 8

| Comparison table of detection results of pin8 on an upper edge (unit: mm) | | |
|---|---|---|
| Pose | Dual camera | Single camera |
| 1 | 0.497316 | 0.525078 |
| 2 | 0.494954 | 0.518737 |
| 3 | 0.492694 | 0.537573 |
| 4 | 0.497401 | 0.519747 |
| 5 | 0.493247 | 0.528737 |
| 6 | 0.500643 | 0.527074 |
| 7 | 0.502386 | 0.527048 |
| 8 | 0.499557 | 0.529826 |
| 9 | 0.499080 | 0.530244 |
| 10 | 0.500263 | 0.511432 |
| 11 | 0.500073 | 0.528348 |
| 12 | 0.498993 | 0.533324 |
| 13 | 0.498961 | 0.537324 |
| 14 | 0.493776 | 0.523266 |
| 15 | 0.503884 | 0.523981 |
| Average value | 0.498215 | 0.526783 |
| MAX − MIN | 0.011190 | 0.026141 |

It can be seen from Table 8 that the average value of the detection results of the dual camera of the pin8 on the upper edge is 0.498215 mm, the average value of the detection results of the single camera on this pin is 0.526783 mm, and the average value of the detection results of the dual camera is closer to 0.5 mm, therefore, the detection results are more accurate. The MAX-MIN value of the detection result of the dual camera is 0.011190 mm, the MAX-MIN value of the detection result of the single camera is 0.026141 mm, the dynamic repeatability error of the dual camera is smaller, and the system of the dual camera is more stable.

TABLE 9

| Comparison table of detection results of pin9 on an upper edge (unit: mm) | | |
|---|---|---|
| Pose | Dual camera | Single camera |
| 1 | 0.505442 | 0.508083 |
| 2 | 0.498439 | 0.508124 |
| 3 | 0.500001 | 0.513529 |
| 4 | 0.503529 | 0.500351 |
| 5 | 0.500722 | 0.509721 |
| 6 | 0.504971 | 0.511166 |
| 7 | 0.508812 | 0.500064 |
| 8 | 0.505345 | 0.505345 |
| 9 | 0.506115 | 0.502123 |
| 10 | 0.498316 | 0.500099 |
| 11 | 0.503727 | 0.510882 |
| 12 | 0.498359 | 0.508877 |
| 13 | 0.502513 | 0.510529 |
| 14 | 0.501518 | 0.510617 |
| 15 | 0.498619 | 0.499074 |
| Average value | 0.502429 | 0.506572 |
| MAX − MIN | 0.010496 | 0.014455 |

It can be seen from Table 9 that the average value of the detection results of the dual camera of the pin9 on the upper edge is 0.502429 mm, the average value of the detection results of the single camera on this pin is 0.506572 mm, and the average value of the detection results of the dual camera is closer to 0.5 mm, therefore, the detection results are more accurate. The MAX-MIN value of the detection result of the dual camera is 0.010496 mm, the MAX-MIN value of the detection result of the single camera is 0.014455 mm, the dynamic repeatability error of the dual camera is smaller, and the system of the dual camera is more stable.

TABLE 10

| Comparison table of detection results of pin10 on an upper edge (unit: mm) | | |
|---|---|---|
| Pose | Dual camera | Single camera |
| 1 | 0.504837 | 0.497238 |
| 2 | 0.502859 | 0.497121 |
| 3 | 0.502544 | 0.514595 |
| 4 | 0.507524 | 0.505800 |
| 5 | 0.502982 | 0.506013 |
| 6 | 0.503344 | 0.506064 |
| 7 | 0.502907 | 0.501715 |
| 8 | 0.503305 | 0.506921 |
| 9 | 0.504938 | 0.508786 |
| 10 | 0.504822 | 0.501826 |
| 11 | 0.507747 | 0.507098 |
| 12 | 0.504600 | 0.505980 |
| 13 | 0.504562 | 0.508684 |
| 14 | 0.499512 | 0.505876 |
| 15 | 0.506091 | 0.506190 |
| Average value | 0.504172 | 0.505327 |
| MAX − MIN | 0.008235 | 0.017474 |

It can be seen from Table 10 that the average value of the detection results of the dual camera of the pin10 on the upper edge is 0.504172 mm, the average value of the detection results of the single camera on this pin is 0.505327 mm, and the average value of the detection results of the dual camera is closer to 0.5 mm, therefore, the detection results are more accurate. The MAX-MIN value of the detection result of the dual camera is 0.008235 mm, the MAX-MIN value of the detection result of the single camera is 0.017474 mm, the dynamic repeatability error of the dual camera is smaller, and the system of the dual camera is more stable.

TABLE 11

Comparison table of detection results of pin11 on an upper edge (unit: mm)

| Pose | Dual camera | Single camera |
|---|---|---|
| 1 | 0.501743 | 0.494178 |
| 2 | 0.504119 | 0.495590 |
| 3 | 0.498004 | 0.500532 |
| 4 | 0.501939 | 0.497078 |
| 5 | 0.503263 | 0.486967 |
| 6 | 0.500604 | 0.493742 |
| 7 | 0.500461 | 0.489859 |
| 8 | 0.505215 | 0.496534 |
| 9 | 0.510407 | 0.495700 |
| 10 | 0.505183 | 0.490193 |
| 11 | 0.493693 | 0.495895 |
| 12 | 0.501803 | 0.494424 |
| 13 | 0.502898 | 0.493907 |
| 14 | 0.503695 | 0.497008 |
| 15 | 0.505627 | 0.492257 |
| Average value | 0.502577 | 0.494258 |
| MAX − MIN | 0.016714 | 0.013565 |

It can be seen from Table 11 that the average value of the detection results of the dual camera of the pin11 on the upper edge is 0.502577 mm, the average value of the detection results of the single camera on this pin is 0.494258 mm, and the average value of the detection results of the dual camera is closer to 0.5 mm, therefore, the detection results are more accurate. The MAX-MIN value of the detection result of the dual camera is 0.016714 mm, the MAX-MIN value of the detection result of the single camera is 0.013565 mm, the dynamic repeatability error of the dual camera is smaller, and the system of the dual camera is more stable.

TABLE 12

Comparison table of detection results of pin12 on an upper edge (unit: mm)

| Pose | Dual camera | Single camera |
|---|---|---|
| 1 | 0.498849 | 0.491493 |
| 2 | 0.500440 | 0.487498 |
| 3 | 0.499131 | 0.486844 |
| 4 | 0.501639 | 0.491283 |
| 5 | 0.500898 | 0.484355 |
| 6 | 0.496860 | 0.487725 |
| 7 | 0.507452 | 0.477537 |
| 8 | 0.502923 | 0.488489 |
| 9 | 0.504637 | 0.486907 |
| 10 | 0.501939 | 0.484099 |
| 11 | 0.499601 | 0.495414 |
| 12 | 0.504304 | 0.484429 |
| 13 | 0.504470 | 0.489781 |
| 14 | 0.504977 | 0.493902 |
| 15 | 0.507049 | 0.484015 |
| Average value | 0.502345 | 0.487585 |
| MAX − MIN | 0.010592 | 0.017877 |

It can be seen from Table 12 that the average value of the detection results of the dual camera of the pin12 on the upper edge is 0.502345 mm, the average value of the detection results of the single camera on this pin is 0.487585 mm, and the average value of the detection results of the dual camera is closer to 0.5 mm, therefore, the detection results are more accurate. The MAX-MIN value of the detection result of the dual camera is 0.010592 mm, the MAX-MIN value of the detection result of the single camera is 0.017877 mm, the dynamic repeatability error of the dual camera is smaller, and the system of the dual camera is more stable.

TABLE 13

Comparison table of detection results of pin13 on an upper edge (unit: mm)

| Pose | Dual camera | Single camera |
|---|---|---|
| 1 | 0.505638 | 0.456844 |
| 2 | 0.503633 | 0.456620 |
| 3 | 0.506765 | 0.463476 |
| 4 | 0.505352 | 0.457744 |
| 5 | 0.501151 | 0.449294 |
| 6 | 0.499005 | 0.464538 |
| 7 | 0.504930 | 0.459483 |
| 8 | 0.501527 | 0.460976 |
| 9 | 0.507983 | 0.463467 |
| 10 | 0.498599 | 0.462605 |
| 11 | 0.496153 | 0.483160 |
| 12 | 0.499228 | 0.463284 |
| 13 | 0.506334 | 0.462027 |
| 14 | 0.500046 | 0.467808 |
| 15 | 0.508275 | 0.456165 |
| Average value | 0.502975 | 0.461833 |
| MAX − MIN | 0.012122 | 0.033866 |

It can be seen from Table 13 that the average value of the detection results of the dual camera of the pin13 on the upper edge is 0.502975 mm, the average value of the detection results of the single camera on this pin is 0.461833 mm, and the average value of the detection results of the dual camera is closer to 0.5 mm, therefore, the detection results are more accurate. The MAX-MIN value of the detection result of the dual camera is 0.012122 mm, the MAX-MIN value of the detection result of the single camera is 0.033866 mm, the dynamic repeatability error of the dual camera is smaller, and the system of the dual camera is more stable.

TABLE 14

Comparison table of detection results of pin14 on an upper edge (unit: mm)

| Pose | Dual camera | Single camera |
|---|---|---|
| 1 | 0.496866 | 0.453409 |
| 2 | 0.502277 | 0.453512 |
| 3 | 0.499245 | 0.442164 |
| 4 | 0.500759 | 0.442130 |
| 5 | 0.504508 | 0.439013 |
| 6 | 0.506487 | 0.443183 |
| 7 | 0.500707 | 0.442719 |
| 8 | 0.498033 | 0.441629 |
| 9 | 0.499487 | 0.443208 |
| 10 | 0.500292 | 0.454154 |
| 11 | 0.498437 | 0.453260 |
| 12 | 0.493125 | 0.439977 |
| 13 | 0.498289 | 0.451270 |
| 14 | 0.500895 | 0.455339 |
| 15 | 0.499249 | 0.443704 |
| Average value | 0.499910 | 0.446578 |
| MAX − MIN | 0.013362 | 0.016326 |

It can be seen from Table 14 that the average value of the detection results of the dual camera of the pin14 on the upper edge is 0.499910 mm, the average value of the detection results of the single camera on this pin is 0.446578 mm, and the average value of the detection results of the dual camera is closer to 0.5 mm, therefore, the detection results are more accurate. The MAX-MIN value of the detection result of the dual camera is 0.013326 mm, the MAX-MIN value of the detection result of the single camera is 0.016326 mm, the dynamic repeatability error of the dual camera is smaller, and the system of the dual camera is more stable.

In the above, the detection results of the pin1 to pin14 on an upper edge of the chip are recorded in Tables 1 to 14, and the detection results of pin1 to pin14 on a lower edge of the chip are recorded in Tables below.

TABLE 15

Comparison table of detection results of pin1 on a lower edge (unit: mm)

| Pose | Dual camera | Single camera |
|---|---|---|
| 1 | 0.493925 | 0.433610 |
| 2 | 0.498633 | 0.440873 |
| 3 | 0.495864 | 0.438142 |
| 4 | 0.496209 | 0.439893 |
| 5 | 0.495475 | 0.428912 |
| 6 | 0.501530 | 0.445344 |
| 7 | 0.494125 | 0.442629 |
| 8 | 0.490874 | 0.437726 |
| 9 | 0.498007 | 0.442173 |
| 10 | 0.494188 | 0.445809 |
| 11 | 0.499943 | 0.438407 |
| 12 | 0.498051 | 0.427250 |
| 13 | 0.501974 | 0.447280 |
| 14 | 0.498485 | 0.441054 |
| 15 | 0.496952 | 0.434441 |
| Average value | 0.496949 | 0.438903 |
| MAX − MIN | 0.011100 | 0.020030 |

It can be seen from Table 15 that the average value of the detection results of the dual camera of the pin1 on the lower edge is 0.496949 mm, the average value of the detection results of the single camera on this pin is 0.438903 mm, and the average value of the detection results of the dual camera is closer to 0.5 mm, therefore, the detection results are more accurate. The MAX-MIN value of the detection result of the dual camera is 0.011100 mm, the MAX-MIN value of the detection result of the single camera is 0.020030 mm, the dynamic repeatability error of the dual camera is smaller, and the system of the dual camera is more stable.

TABLE 16

Comparison table of detection results of pin2 on a lower edge (unit: mm)

| Pose | Dual camera | Single camera |
|---|---|---|
| 1 | 0.493290 | 0.470944 |
| 2 | 0.493109 | 0.476030 |
| 3 | 0.490601 | 0.464812 |
| 4 | 0.490383 | 0.471090 |
| 5 | 0.489221 | 0.459185 |
| 6 | 0.493053 | 0.468110 |
| 7 | 0.488952 | 0.468713 |
| 8 | 0.496754 | 0.467235 |
| 9 | 0.492789 | 0.475517 |
| 10 | 0.495155 | 0.479281 |
| 11 | 0.496304 | 0.478835 |
| 12 | 0.498176 | 0.467501 |
| 13 | 0.493851 | 0.474074 |
| 14 | 0.495601 | 0.470644 |
| 15 | 0.491158 | 0.460144 |
| Average value | 0.493226 | 0.470141 |
| MAX − MIN | 0.009224 | 0.020096 |

It can be seen from Table 16 that the average value of the detection results of the dual camera of the pin2 on the lower edge is 0.493226 mm, the average value of the detection results of the single camera on this pin is 0.470141 mm, and the average value of the detection results of the dual camera is closer to 0.5 mm, therefore, the detection results are more accurate. The MAX-MIN value of the detection result of the dual camera is 0.009224 mm, the MAX-MIN value of the detection result of the single camera is 0.020096 mm, the dynamic repeatability error of the dual camera is smaller, and the system of the dual camera is more stable.

TABLE 17

Comparison table of detection results of pin3 on a lower edge (unit: mm)

| Pose | Dual camera | Single camera |
|---|---|---|
| 1 | 0.503963 | 0.481924 |
| 2 | 0.496220 | 0.484031 |
| 3 | 0.500182 | 0.480616 |
| 4 | 0.499771 | 0.485653 |
| 5 | 0.503468 | 0.479417 |
| 6 | 0.491763 | 0.480536 |
| 7 | 0.494902 | 0.475856 |
| 8 | 0.492984 | 0.481660 |
| 9 | 0.497627 | 0.481985 |
| 10 | 0.499244 | 0.487311 |
| 11 | 0.500030 | 0.487049 |
| 12 | 0.499385 | 0.474494 |
| 13 | 0.498650 | 0.483210 |
| 14 | 0.493888 | 0.479572 |
| 15 | 0.498751 | 0.477920 |
| Average value | 0.498055 | 0.481416 |
| MAX − MIN | 0.012200 | 0.012817 |

It can be seen from Table 17 that the average value of the detection results of the dual camera of the pin3 on the lower edge is 0.498055 mm, the average value of the detection results of the single camera on this pin is 0.481416 mm, and the average value of the detection results of the dual camera is closer to 0.5 mm, therefore, the detection results are more accurate. The MAX-MIN value of the detection result of the dual camera is 0.012200 mm, the MAX-MIN value of the detection result of the single camera is 0.012817 mm, the dynamic repeatability error of the dual camera is smaller, and the system of the dual camera is more stable.

TABLE 18

Comparison table of detection results of pin4 on a lower edge (unit: mm)

| Pose | Dual camera | Single camera |
|---|---|---|
| 1 | 0.496446 | 0.496428 |
| 2 | 0.505275 | 0.494794 |
| 3 | 0.508305 | 0.496165 |
| 4 | 0.508175 | 0.495381 |
| 5 | 0.505335 | 0.493376 |
| 6 | 0.497765 | 0.491867 |
| 7 | 0.497000 | 0.499179 |
| 8 | 0.497814 | 0.496895 |
| 9 | 0.502243 | 0.498927 |
| 10 | 0.496227 | 0.489532 |
| 11 | 0.503779 | 0.497952 |
| 12 | 0.502191 | 0.486725 |
| 13 | 0.498565 | 0.499668 |
| 14 | 0.496972 | 0.492821 |
| 15 | 0.499486 | 0.495936 |
| Average value | 0.501039 | 0.495043 |
| MAX − MIN | 0.012078 | 0.012943 |

It can be seen from Table 18 that the average value of the detection results of the dual camera of the pin4 on the lower edge is 0.501039 mm, the average value of the detection results of the single camera on this pin is 0.495034 mm, and the average value of the detection results of the dual camera is closer to 0.5 mm, therefore, the detection results are more accurate. The MAX-MIN value of the detection result of the dual camera is 0.012078 mm, the MAX-MIN value of the detection result of the single camera is 0.012943 mm, the dynamic repeatability error of the dual camera is smaller, and the system of the dual camera is more stable.

TABLE 19

Comparison table of detection results of pin5 on a lower edge (unit: mm)

| Pose | Dual camera | Single camera |
|---|---|---|
| 1 | 0.501803 | 0.501948 |
| 2 | 0.499806 | 0.503291 |
| 3 | 0.500863 | 0.503324 |
| 4 | 0.499330 | 0.505935 |
| 5 | 0.503389 | 0.503432 |
| 6 | 0.503322 | 0.509890 |
| 7 | 0.500808 | 0.502811 |
| 8 | 0.507288 | 0.504444 |
| 9 | 0.502419 | 0.504614 |
| 10 | 0.501989 | 0.499529 |
| 11 | 0.504348 | 0.508569 |
| 12 | 0.501082 | 0.503354 |
| 13 | 0.495090 | 0.511415 |
| 14 | 0.493073 | 0.496873 |
| 15 | 0.497203 | 0.501506 |
| Average value | 0.500788 | 0.504062 |
| MAX − MIN | 0.014215 | 0.014542 |

It can be seen from Table 19 that the average value of the detection results of the dual camera of the pin5 on the lower edge is 0.500788 mm, the average value of the detection results of the single camera on this pin is 0.504062 mm, and the average value of the detection results of the dual camera is closer to 0.5 mm, therefore, the detection results are more accurate. The MAX-MIN value of the detection result of the dual camera is 0.014215 mm, the MAX-MIN value of the detection result of the single camera is 0.014542 mm, the dynamic repeatability error of the dual camera is smaller, and the system of the dual camera is more stable.

TABLE 20

Comparison table of detection results of pin6 on a lower edge (unit: mm)

| Pose | Dual camera | Single camera |
|---|---|---|
| 1 | 0.506164 | 0.508908 |
| 2 | 0.502524 | 0.501955 |
| 3 | 0.505512 | 0.505545 |
| 4 | 0.505987 | 0.508683 |
| 5 | 0.502988 | 0.511026 |
| 6 | 0.502004 | 0.510761 |
| 7 | 0.501616 | 0.510510 |
| 8 | 0.502616 | 0.511229 |
| 9 | 0.499371 | 0.509686 |
| 10 | 0.505107 | 0.504107 |
| 11 | 0.509114 | 0.508059 |
| 12 | 0.496564 | 0.510783 |
| 13 | 0.506527 | 0.506254 |
| 14 | 0.506585 | 0.501569 |
| 15 | 0.501827 | 0.509193 |
| Average value | 0.503634 | 0.507885 |
| MAX − MIN | 0.012550 | 0.009660 |

It can be seen from Table 20 that the average value of the detection results of the dual camera of the pin6 on the lower edge is 0.503634 mm, the average value of the detection results of the single camera on this pin is 0.507885 mm, and the average value of the detection results of the dual camera is closer to 0.5 mm, therefore, the detection results are more accurate. The MAX-MIN value of the detection result of the dual camera is 0.012550 mm, the MAX-MIN value of the detection result of the single camera is 0.009660 mm, the dynamic repeatability error of the single camera is smaller, and the system of the single camera is more stable.

TABLE 21

Comparison table of detection results of pin7 on a lower edge (unit: mm)

| Pose | Dual camera | Single camera |
|---|---|---|
| 1 | 0.501792 | 0.511683 |
| 2 | 0.504753 | 0.508049 |
| 3 | 0.506294 | 0.514490 |
| 4 | 0.505125 | 0.514102 |
| 5 | 0.506361 | 0.519521 |
| 6 | 0.498954 | 0.516073 |
| 7 | 0.496616 | 0.511545 |
| 8 | 0.510575 | 0.511109 |
| 9 | 0.506342 | 0.513182 |
| 10 | 0.500818 | 0.505503 |
| 11 | 0.506749 | 0.514607 |
| 12 | 0.503110 | 0.510588 |
| 13 | 0.505318 | 0.512135 |
| 14 | 0.502136 | 0.509417 |
| 15 | 0.508007 | 0.511700 |
| Average value | 0.504197 | 0.512247 |
| MAX − MIN | 0.013959 | 0.014018 |

It can be seen from Table 21 that the average value of the detection results of the dual camera of the pin7 on the lower edge is 0.504197 mm, the average value of the detection results of the single camera on this pin is 0.512247 mm, and the average value of the detection results of the dual camera is closer to 0.5 mm, therefore, the detection results are more accurate. The MAX-MIN value of the detection result of the dual camera is 0.013959 mm, the MAX-MIN value of the detection result of the single camera is 0.014018 mm, the dynamic repeatability error of the dual camera is smaller, and the system of the dual camera is more stable.

TABLE 22

Comparison table of detection results of pin8 on a lower edge (unit: mm)

| Pose | Dual camera | Single camera |
|---|---|---|
| 1 | 0.502569 | 0.504453 |
| 2 | 0.504486 | 0.503456 |
| 3 | 0.497215 | 0.507721 |
| 4 | 0.501266 | 0.507076 |
| 5 | 0.500265 | 0.515364 |
| 6 | 0.503850 | 0.511631 |
| 7 | 0.505018 | 0.507253 |
| 8 | 0.498729 | 0.510043 |
| 9 | 0.505457 | 0.511997 |
| 10 | 0.506848 | 0.509991 |
| 11 | 0.508305 | 0.505671 |
| 12 | 0.501826 | 0.513544 |
| 13 | 0.500412 | 0.505624 |
| 14 | 0.501327 | 0.504615 |
| 15 | 0.493630 | 0.511850 |
| Average value | 0.502080 | 0.508686 |
| MAX − MIN | 0.014675 | 0.011908 |

It can be seen from Table 22 that the average value of the detection results of the dual camera of the pin8 on the lower edge is 0.502080 mm, the average value of the detection results of the single camera on this pin is 0.508686 mm, and the average value of the detection results of the dual camera is closer to 0.5 mm, therefore, the detection results are more accurate. The MAX-MIN value of the detection result of the dual camera is 0.014675 mm, the MAX-MIN value of the detection result of the single camera is 0.011908 mm, the dynamic repeatability error of the single camera is smaller, and the system of the single camera is more stable.

TABLE 23

Comparison table of detection results of pin9 on a lower edge (unit: mm)

| Pose | Dual camera | Single camera |
|---|---|---|
| 1 | 0.500633 | 0.506283 |
| 2 | 0.502056 | 0.496145 |
| 3 | 0.500761 | 0.500622 |
| 4 | 0.501589 | 0.503008 |
| 5 | 0.510239 | 0.503672 |
| 6 | 0.500368 | 0.503917 |
| 7 | 0.501223 | 0.503366 |
| 8 | 0.500527 | 0.503589 |
| 9 | 0.501494 | 0.511652 |
| 10 | 0.498519 | 0.500670 |
| 11 | 0.497721 | 0.501932 |
| 12 | 0.501969 | 0.503189 |
| 13 | 0.506721 | 0.504934 |
| 14 | 0.495465 | 0.499979 |
| 15 | 0.503110 | 0.509298 |
| Average value | 0.501493 | 0.503484 |
| MAX − MIN | 0.014774 | 0.015507 |

It can be seen from Table 23 that the average value of the detection results of the dual camera of the pin9 on the lower edge is 0.501493 mm, the average value of the detection results of the single camera on this pin is 0.503484 mm, and the average value of the detection results of the dual camera is closer to 0.5 mm, therefore, the detection results are more accurate. The MAX-MIN value of the detection result of the dual camera is 0.014774 mm, the MAX-MIN value of the detection result of the single camera is 0.015507 mm, the dynamic repeatability error of the dual camera is smaller, and the system of the dual camera is more stable.

TABLE 24

Comparison table of detection results of pin10 on a lower edge (unit: mm)

| Pose | Dual camera | Single camera |
|---|---|---|
| 1 | 0.499550 | 0.495873 |
| 2 | 0.504853 | 0.493173 |
| 3 | 0.501717 | 0.495354 |
| 4 | 0.500373 | 0.493339 |
| 5 | 0.501260 | 0.497998 |
| 6 | 0.506674 | 0.490876 |
| 7 | 0.504938 | 0.489484 |
| 8 | 0.505169 | 0.491806 |
| 9 | 0.497995 | 0.493869 |
| 10 | 0.500444 | 0.492745 |
| 11 | 0.499975 | 0.490053 |
| 12 | 0.499119 | 0.496465 |
| 13 | 0.503146 | 0.487846 |
| 14 | 0.498330 | 0.491726 |
| 15 | 0.507237 | 0.495981 |
| Average value | 0.502052 | 0.493106 |
| MAX-MIN | 0.009242 | 0.010152 |

It can be seen from Table 24 that the average value of the detection results of the dual camera of the pin10 on the lower edge is 0.502052 mm, the average value of the detection results of the single camera on this pin is 0.493106 mm, and the average value of the detection results of the dual camera is closer to 0.5 mm, therefore, the detection results are more accurate. The MAX-MIN value of the detection result of the dual camera is 0.009242 mm, the MAX-MIN value of the detection result of the single camera is 0.010152 mm, the dynamic repeatability error of the dual camera is smaller, and the system of the dual camera is more stable.

TABLE 25

Comparison table of detection results of pin11 on a lower edge (unit: mm)

| Pose | Dual camera | Single camera |
|---|---|---|
| 1 | 0.497009 | 0.484609 |
| 2 | 0.497014 | 0.485922 |
| 3 | 0.498100 | 0.482162 |
| 4 | 0.499487 | 0.487815 |
| 5 | 0.498566 | 0.490044 |
| 6 | 0.503983 | 0.484168 |
| 7 | 0.498762 | 0.477973 |
| 8 | 0.497738 | 0.482966 |
| 9 | 0.495133 | 0.481985 |
| 10 | 0.505949 | 0.489127 |
| 11 | 0.503417 | 0.480892 |
| 12 | 0.497321 | 0.480437 |
| 13 | 0.499129 | 0.481890 |
| 14 | 0.496467 | 0.483849 |
| 15 | 0.497636 | 0.487138 |
| Average value | 0.499047 | 0.484065 |
| MAX − MIN | 0.010816 | 0.012071 |

It can be seen from Table 25 that the average value of the detection results of the dual camera of the pin11 on the lower edge is 0.499047 mm, the average value of the detection results of the single camera on this pin is 0.484065 mm, and the average value of the detection results of the dual camera is closer to 0.5 mm, therefore, the detection results are more accurate. The MAX-MIN value of the detection result of the dual camera is 0.010816 mm, the MAX-MIN value of the detection result of the single camera is 0.012071 mm, the dynamic repeatability error of the dual camera is smaller, and the system of the dual camera is more stable.

TABLE 26

Comparison table of detection results of pin12 on a lower edge (unit: mm)

| Pose | Dual camera | Single camera |
|---|---|---|
| 1 | 0.503543 | 0.463069 |
| 2 | 0.503112 | 0.470596 |
| 3 | 0.504179 | 0.467243 |
| 4 | 0.503311 | 0.472622 |
| 5 | 0.505527 | 0.462877 |
| 6 | 0.499651 | 0.467735 |
| 7 | 0.498601 | 0.456016 |
| 8 | 0.501914 | 0.460331 |
| 9 | 0.493090 | 0.472606 |
| 10 | 0.497611 | 0.474087 |
| 11 | 0.497165 | 0.466325 |
| 12 | 0.498297 | 0.466735 |
| 13 | 0.491938 | 0.461712 |
| 14 | 0.500763 | 0.470554 |
| 15 | 0.502565 | 0.476223 |
| Average value | 0.500084 | 0.467249 |
| MAX − MIN | 0.013589 | 0.020207 |

It can be seen from Table 26 that the average value of the detection results of the dual camera of the pin12 on the lower edge is 0.500084 mm, the average value of the detection results of the single camera on this pin is 0.467249 mm, and the average value of the detection results of the dual camera is closer to 0.5 mm, therefore, the detection results are more accurate. The MAX-MIN value of the detection result of the dual camera is 0.013589 mm, the MAX-MIN value of the detection result of the single camera is 0.020207 mm, the dynamic repeatability error of the dual camera is smaller, and the system of the dual camera is more stable.

TABLE 27

Comparison table of detection results of pin13 on a lower edge (unit: mm)

| Pose | Dual camera | Single camera |
|---|---|---|
| 1 | 0.496760 | 0.451729 |
| 2 | 0.504913 | 0.452011 |
| 3 | 0.502790 | 0.449098 |
| 4 | 0.501452 | 0.453946 |
| 5 | 0.497911 | 0.444371 |
| 6 | 0.499508 | 0.444068 |
| 7 | 0.498548 | 0.443289 |
| 8 | 0.496173 | 0.443370 |
| 9 | 0.495193 | 0.449781 |
| 10 | 0.498165 | 0.459753 |
| 11 | 0.496300 | 0.443063 |
| 12 | 0.499743 | 0.447075 |
| 13 | 0.499223 | 0.439943 |
| 14 | 0.495891 | 0.448962 |
| 15 | 0.489828 | 0.448854 |
| Average value | 0.498160 | 0.447954 |
| MAX − MIN | 0.015085 | 0.019810 |

It can be seen from Table 27 that the average value of the detection results of the dual camera of the pin13 on the lower edge is 0.498160 mm, the average value of the detection results of the single camera on this pin is 0.447954 mm, and the average value of the detection results of the dual camera is closer to 0.5 mm, therefore, the detection results are more accurate. The MAX-MIN value of the detection result of the dual camera is 0.015085 mm, the MAX-MIN value of the detection result of the single camera is 0.019810 mm, the dynamic repeatability error of the dual camera is smaller, and the system of the dual camera is more stable.

TABLE 28

Comparison table of detection results of pin14 on a lower edge (unit: mm)

| Pose | Dual camera | Single camera |
|---|---|---|
| 1 | 0.499990 | 0.428600 |
| 2 | 0.489284 | 0.431596 |
| 3 | 0.492370 | 0.427081 |
| 4 | 0.493794 | 0.428814 |
| 5 | 0.499559 | 0.419261 |
| 6 | 0.487314 | 0.414864 |
| 7 | 0.496001 | 0.416965 |
| 8 | 0.497509 | 0.417193 |
| 9 | 0.493430 | 0.424871 |
| 10 | 0.498899 | 0.437358 |
| 11 | 0.497531 | 0.422459 |
| 12 | 0.501520 | 0.410202 |
| 13 | 0.497586 | 0.414349 |
| 14 | 0.492655 | 0.430731 |
| 15 | 0.488750 | 0.436033 |
| Average value | 0.495079 | 0.424025 |
| MAX − MIN | 0.014206 | 0.027156 |

It can be seen from Table 28 that the average value of the detection results of the dual camera of the pin14 on the lower edge is 0.495079 mm, the average value of the detection results of the single camera on this pin is 0.424025 mm, and the average value of the detection results of the dual camera is closer to 0.5 mm, therefore, the detection results are more accurate. The MAX-MIN value of the detection result of the dual camera is 0.014206 mm, the MAX-MIN value of the detection result of the single camera is 0.027156 mm, the dynamic repeatability error of the dual camera is smaller, and the system of the dual camera is more stable.

Figure 14:
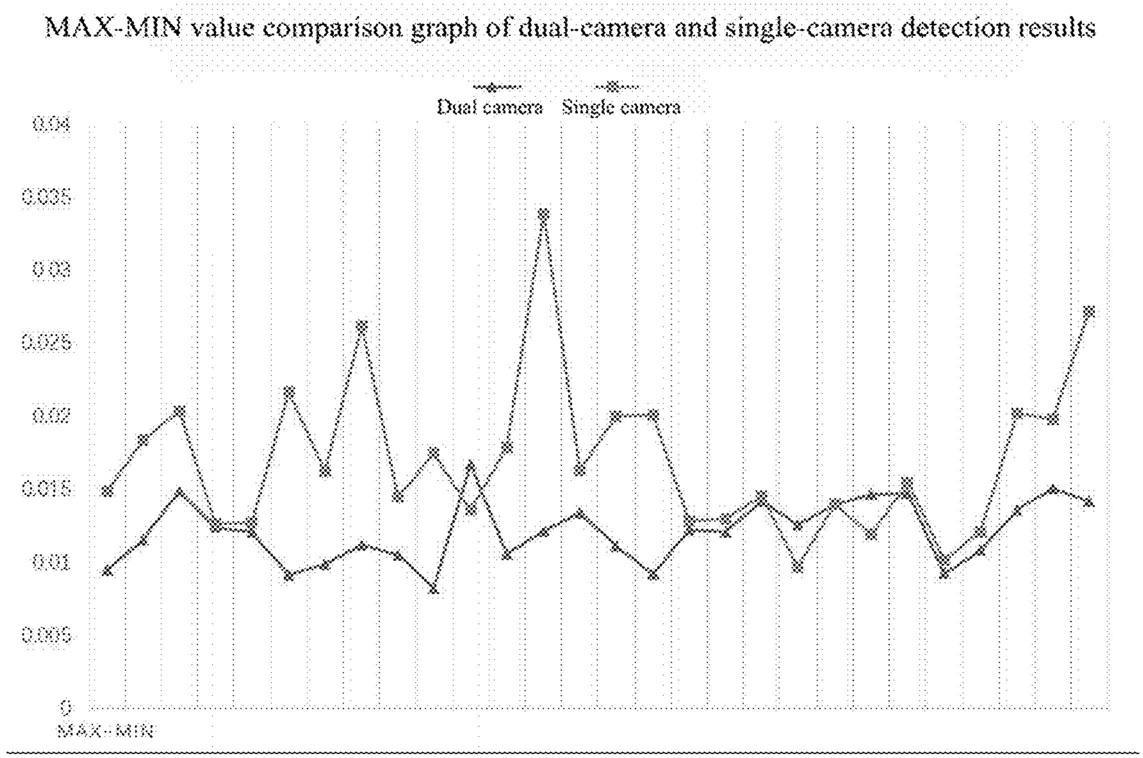
FIG. 14 is a MAX-MIN value comparison graph of detection results of a dual-camera and single-camera detection system.
Figure 15:
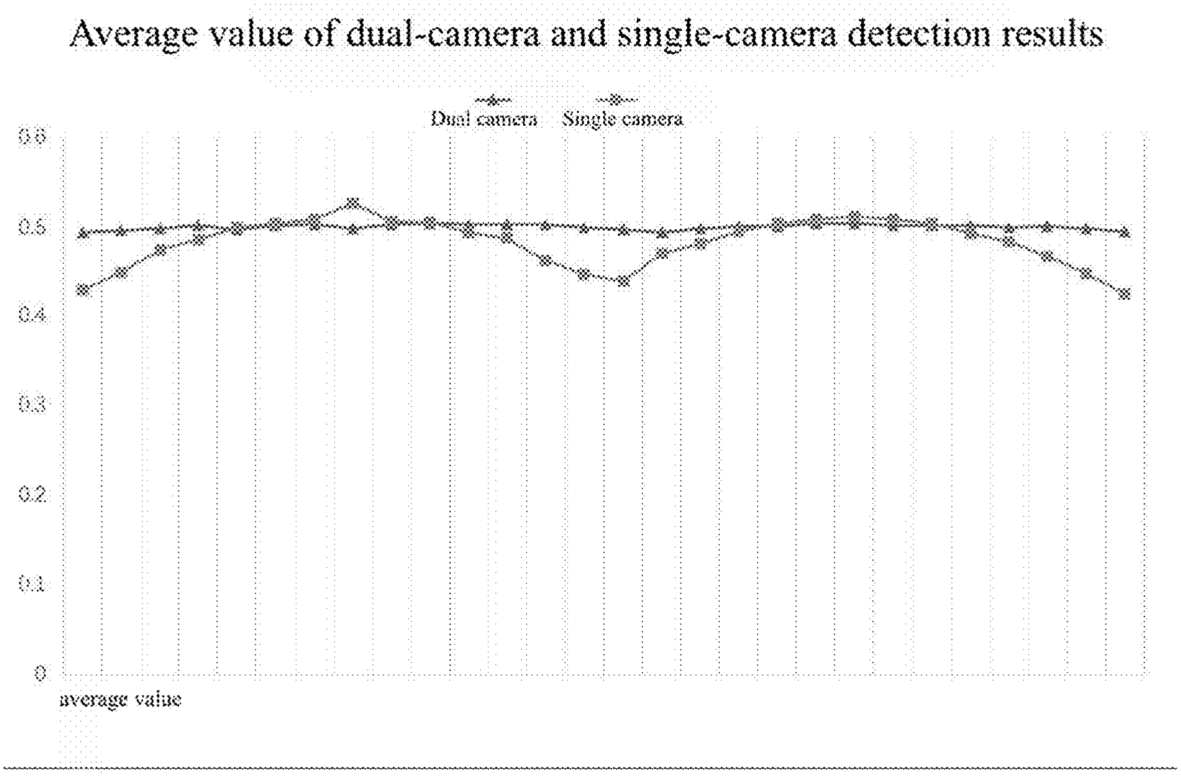
FIG. 15 is a graph comparing average values of detection results of a dual-camera and single-camera detection system.

In summary, as shown in FIG. 14, the data in the 28 tables are combined, and the MAX-MIN values of the detection results of the single camera and the dual camera are compared, it can be seen that the detection result of the dual camera is more accurate in most cases, and the system of the dual camera is more stable. Moreover, the maximum dynamic error of the single camera is 0.0339 mm and the maximum dynamic error of the dual camera is 0.0167 mm by comparing all the MAX-MIN result values, and it can be seen that the system of the existing dual-camera binocular detection device is more stable. As shown in FIG. 15, the average value of the detection results of the dual camera fluctuates less, and the average value of the detection results of the single camera fluctuates more, so that the detection results of the dual camera are more accurate.

The present invention and implementation thereof have been described above schematically without limitation, and the present invention can be implemented in other specific forms without departing from the spirits or basic features of the present invention. The embodiment shown in the drawings is merely one of the embodiments of the present invention, the actual structure is not limited to this embodiment, and any reference numerals in the claims shall not limit the related claims. Therefore, similar structural forms and embodiments to the technical solution, which are designed according to inspiration of the accompanying drawings by those of ordinary skill in the art, without departing from the spirits of the present invention and without creative efforts, shall fall within the protection scope of the present invention. In addition, the word "include" does not exclude another element or another step, and the word "a" or "an" preceding an element does not exclude the inclusion of a plurality of such elements. Multiple elements stated in a product claim may also be implemented by one element in software or hardware. The terms first, second and the like are used to denote names, but not to represent any particular order.

The invention claimed is:

1. A virtual binocular detection device for imaging detection of a to-be-detected object (6), comprising:

a light source (1) configured to generate light for imaging detection;

two imaging components (2) arranged side by side and configured to receive the light and perform imaging, a light path deflection component (3) positioned between the light source (1) and the imaging component (2) and configured to receive and refract the light reflected by a surface of the to-be-detected object (6) so as to make main light parallelly emit into the imaging component (2); and wherein the imaging component (2) comprises an industrial lens (201) configured to receive light and a vision camera (202) configured for imaging; the industrial lens (201) uses a fixed-focus lens, and the industrial lens (201) has a focal length F of 35-55 mm; and the vision camera (202) uses a board level camera.

2. The virtual binocular detection device according to claim 1, wherein the light path deflection component (3) comprises symmetrically distributed prisms corresponding to the imaging component (2), wherein each of the prisms is wedge-shaped, and each of the prisms has a deflection angle $\alpha$ of 10-20 degrees.

3. The virtual binocular detection device according to claim 1, wherein the light source (1) comprises a blue light source (101) and a red light source (102) arranged in sequence, and the red light source (102) is closer to the to-be-detected object (6); the light source (1) comprises a frame with an opening in the middle, and a plurality of light sources are arranged on the frame; and an opening of a frame of the red light source (102) is greater than that of the blue light source (101).

4. The virtual binocular detection device according to claim 1, further comprising: a housing (4) having an inner cavity (5), wherein the light source (1), the imaging component (2) and the light path deflection component (3) all are positioned within the inner cavity (5).

5. The virtual binocular detection device according to claim 1, further comprising: a base (7) connected to the industrial lens (201) and the light path deflection component (3), wherein a cavity of the base (7) at least has an opening (14) at one side for receiving light and a pressing plate (8) arranged in the cavity for limiting the light path deflection component (3), the pressing plate (8) divides the cavity into an imaging cavity (10) configured to receive imaging light in cooperation with the industrial lens (201) and a mounting cavity (11) configured to mount the light path deflection component (3), and a through groove (801) is arranged on the pressing plate (8) for communicating the imaging cavity (10) and the mounting cavity (11).

6. The virtual binocular detection device according to claim 5, wherein the light path deflection component (3) comprises two combined triangular prisms (301), and light receiving surfaces of the two triangular prisms (301) are combined into an inverted V shape and to form a top angle (303) and two support angles (302) of the light path deflection component (3).

7. The virtual binocular detection device according to claim 6, wherein the cavity of the base (7) has an inwardly protruding support step (12) around the opening (14) of the cavity, the support step (12) supports the support angles (302) connected to the light path deflection component (3); the pressing plate (8) is provided with a reinforcing plate (802) that divides the through groove (801) into two parts, and the reinforcing plate (802) is connected to the top corner (303) of the light path deflection component (3); and one side that is of the reinforcing plate (802) and faces the light path deflection component (3) is provided with a limiting frame (803), and the limiting frame (803) has a limiting surface matched with the top angle (303) of the light path deflection component (3).

8. A chip pin warpage detection method based on the virtual binocular detection device according to claim 1, comprising the following steps:

S1: establishing a binocular vision detection model comprising the light source (1), two imaging components (2) arranged side by side, the light path deflection component (3) and the industrial personal computer, wherein the imaging component (2) comprises the industrial lens (201) and the vision camera (202);

S2: controlling the light source (1) to be turned on by the industrial personal computer, refracting a chip pin transmitted to the position right below the light source (1) through the light path deflection component (3) and then parallelly emitting into two corresponding industrial lenses (201), and simultaneously collecting chip pin images by the two vision cameras (202), wherein the light path deflection component (3) has a deflection angle α of 10-20 degrees;

S3: simultaneously collecting chip pin refraction imaging in the industrial lens (201) by two vision cameras (202) and sending the collected chip pin images to an industrial personal computer, wherein the chip pin images comprise a first image and a second image of the chip pin; and S4: receiving and processing the chip pin images by the industrial personal computer to obtain a three-dimensional view of the chip pins, and determining whether the pin is warped according to the three-dimensional view of the chip pins.

9. The chip pin warpage detection method according to claim 8, wherein in the step S2, a blue light source (101) is turned on, and the vision camera (202) collects images of the chip pins; the red light source (102) is turned on, and the vision camera (202) collects surface and character images of a plastic package body of the chip; and the industrial personal computer simultaneously processes the separately collected images.

10. The chip pin warpage detection method according to claim 8, wherein the step S4 comprises the following steps:

S41: processing the first image and the second image of the chip pin, performing binocular calibration and stereo correction on the first image and the second image of the chip pin, obtaining y coordinates of corresponding points of the first image and the second image of the chip pin after the stereo correction, determining x coordinates of the corresponding points by a matching algorithm, obtaining coordinates of corresponding feature points in the first image and the second image, and obtaining parallax of the first image and the second image of the chip pin;

S42: calculating three-dimensional coordinates of the chip pins by a conversion relationship among a world coordinate system, a camera coordinate system, an image physical coordinate system and an image pixel coordinate system in a camera imaging principle based on the parallax of the first image and the second image of the chip pin, and implementing two-dimensional to three-dimensional conversion of the chip pin images;

S43: obtaining three-dimensional coordinates of a pin root and a pin tip of each pin of the chip through the three-dimensional view of the chip pins;

S44: fitting the coordinate points of three-dimensional coordinates of the pin roots into a plane; and S45: determining whether the chip pin is warped according to a distance from each coordinate point of the pin tip to the fitting plane.

11. The chip pin warpage detection method according to claim 8, further comprising the following steps:

S5: sending a detection result by the industrial personal computer to a machine, if the detection result is qualified, sending the chip to the next procedure through a taping by the machine, if the detection result is not qualified, sending a detection signal to the industrial personal computer again by the machine, and if the detection result is still not qualified after a plurality of times of circulations, sending alarm information by the machine.

* * * * *